US012686003B2

(12) United States Patent
Kim et al.

(10) Patent No.: US 12,686,003 B2
(45) Date of Patent: Jul. 21, 2026

(54) SUCTION DISPENSING DEVICE HAVING REMOVABLE TIP

(71) Applicant: MICRO DIGITAL CO., LTD, Seongnam-si (KR)

(72) Inventors: Kyung Nam Kim, Gwangju-si (KR); Se Hak Lim, Gunpo-si (KR); Kang Jae Kim, Seongnam-si (KR); Jun Kyu Kim, Seongnam-si (KR)

(73) Assignee: MICRO DIGITAL CO., LTD, Seongnam-si (KR)

( * ) Notice: Subject to any disclaimer, the term of this patent is extended or adjusted under 35 U.S.C. 154(b) by 0 days.

(21) Appl. No.: 19/099,989

(22) PCT Filed: Nov. 2, 2023

(86) PCT No.: PCT/KR2023/017360
§ 371 (c)(1),
(2) Date: Jan. 30, 2025

(87) PCT Pub. No.: WO2024/117575
PCT Pub. Date: Jun. 6, 2024

(65) Prior Publication Data

US 2026/0042090 A1 Feb. 12, 2026

(30) Foreign Application Priority Data

Nov. 29, 2022 (KR) ........................ 10-2022-0162822
Sep. 7, 2023 (KR) ........................ 10-2023-0119220

(51) Int. Cl.
*B01L 3/02* (2006.01)

(52) U.S. Cl.
CPC ..... *B01L 3/0279* (2013.01); *B01L 2200/0642* (2013.01)

(58) Field of Classification Search
CPC ................. B01L 3/0275; B01L 3/0279; B01L 2200/0642
See application file for complete search history.

(56) References Cited

U.S. PATENT DOCUMENTS 4,830,832 A * 5/1989 Arpagaus ........... G01N 35/1072 422/65
5,479,969 A * 1/1996 Hardie .................... B65B 3/003 422/549

(Continued)

FOREIGN PATENT DOCUMENTS

JP H07-225235 A 8/1995
JP 2007-322291 A 12/2007

(Continued)

OTHER PUBLICATIONS

Machine translation of KR20190071390 (Year: 2019).*

*Primary Examiner* — Nicolas A Arnett
(74) *Attorney, Agent, or Firm* — Bridgeway IP Law Group, PLLC; Sang Ho Lee; Hyun Woo Shin

(57) ABSTRACT

The present invention relates to a suction dispensing device having a removable tip, which can suction or dispense liquid by allowing a dispensing tip to be mounted thereon and can automatically remove the mounted dispensing tip, the device comprising: a driving base module which raises and lowers a movable plate; and a syringe operation module having at least one syringe installed therein so that when the movable plate rises from a reference position to a suction position, liquid can be suctioned therein, and when the movable plate returns to the reference position from the suction position, the liquid can be dispensed, wherein, in the syringe operation module, when the movable plate moves downward from the reference position to a tip removal position, a tip removal (Continued)

plate may be formed so that the dispensing tip forcefully engaged in the front end of the syringe can be removed.

12 Claims, 24 Drawing Sheets

(56) References Cited

U.S. PATENT DOCUMENTS

| | | | | |
|---|---|---|---|---|
| 6,199,435 | B1 * | 3/2001 | Wilmer | B01L 3/0279<br>73/864.14 |
| 7,687,033 | B2 * | 3/2010 | Itoh | G01N 35/10<br>422/65 |
| 8,333,937 | B2 * | 12/2012 | Hanafusa | G01N 35/10<br>422/430 |
| 12,140,603 | B2 * | 11/2024 | Shibahara | B01L 3/0279 |
| 2003/0074989 | A1 * | 4/2003 | Magnussen, Jr. | B01L 3/0279<br>73/864.14 |
| 2003/0147781 | A1 * | 8/2003 | Viot | B01L 3/0279<br>422/525 |
| 2014/0302611 | A1 * | 10/2014 | Orning | B01L 3/50<br>436/71 |
| 2020/0377845 | A1 * | 12/2020 | Watanabe | B01F 31/26 |

FOREIGN PATENT DOCUMENTS

| | | | |
|---|---|---|---|
| KR | 10-2008-0052469 | A | 6/2008 |
| KR | 10-2012-0111101 | A | 10/2012 |
| KR | 10-2019-0071390 | A | 6/2019 |

* cited by examiner

SUCTION DISPENSING DEVICE HAVING REMOVABLE TIP

TECHNICAL FIELD

The present invention relates to a suction dispensing device having a removable tip, and more specifically, to a suction dispensing device having a removable tip, which aspirates or dispenses liquid by allowing a dispensing tip to be attached thereon and enables the attached dispensing tip to be automatically removed.

Additionally, the present invention was carried out as part of a research project supported by the Ministry of Trade, Industry and Energy and the Korea Evaluation Institute of Industrial Technology under the "Bio-Industry Technology Development-Digital Healthcare" program. [Project title: Development of a Non-invasive Complex Sample Pretreatment Automation System for Digital Healthcare, Project number: 20008702, Project serial number: 1415179590]

BACKGROUND ART

Molecular diagnosis refers to a diagnostic method that directly analyzes the genes (DNA or RNA) of a target substance in a sample to identify the presence of infection of disease, base sequence variations, or mutations, enabling early disease diagnosis and efficient treatment.

Recently, molecular diagnostic methods have been widely used in various medical fields, including confirmation of disease infection, genetic testing, and pharmacogenetic testing.

Various detection methods have been developed for the molecular diagnostic methods, with real-time polymerase chain reaction (PCR) becoming widely used due to its speed, convenience, and sensitivity in detection. Real-time PCR typically uses a probe that forms a specific complementary binding with the gene of a target substance, and fluorescence molecules are attached to the probe. In real-time PCR, the wavelength of these fluorescence molecules is analyzed by an analyzing device to qualitatively/quantitatively analyze the target gene.

In the molecular diagnostic methods, through real-time PCR, the target substance collected on a swab or a collection part is subjected to pretreatment before analysis, and the pretreated substance, i.e., a buffer solution, is analyzed. In conventional techniques, to collect specimens using swabs, a target specimen, i.e., sample, may be collected in various ways, for example, by using nasal swabs, nasopharyngeal swabs, throat swabs, and the like.

Meanwhile, in recent years, automated equipment has been developed to prevent external leakage of samples, increase the accuracy of tests, and enhance the efficiency of testing by reducing testing time, testing manpower, and testing costs through the automation of such molecular diagnostic methods.

DETAILED DESCRIPTION OF THE INVENTION

Technical problem

These conventional automated molecular diagnostic equipment typically employs syringe modules or the like to aspirate or dispense various types of reagents or liquids from cartridges sealed with sealing paper.

However, conventional molecular diagnostic equipment lack a device for removing used dispensing tips from the syringe during the aspiration or dispensing of reagents or liquids, resulting in the inconvenience of having to clean the dispensing tips using separate cleaning devices.

The present invention aims to address these issues and to provide a suction dispensing device having a removable tip, which automatically performs various functions with a single device, including attaching a dispensing tip, aspirating liquid, dispensing liquid, removing a dispensing tip, and punching the sealing paper of a cartridge, thereby not only enabling automation of the device, but also significantly reducing manufacturing costs and installation space while greatly improving reliability and accuracy in performing each function. However, these objects are merely illustrative, and the scope of the present invention is not limited thereto.

Technical Solution

According to an aspect of the present invention, there is provided a suction dispensing device having a removable tip, the device including: a driving base module configured to raise and lower a movable plate; and a syringe operation module having at least one syringe installed therein so that when the movable plate rises from a reference position to a suction position, liquid is suctioned therein, and when the movable plate returns to the reference position from the suction position, the liquid is dispensed, wherein the syringe operation module may include a tip removal plate configured to allow a dispensing tip, forcefully engaged with a front end of the syringe, to be removed when the movable plate moves downward from the reference position to a tip removal position.

In addition, according to the present invention, the driving base module may include a driving base frame; the movable plate configured to be movable up and down along a guide member formed on the driving base frame; a first threaded rod screwed through a first nut member formed on the movable plate to allow the movable plate to move up and down through screw motion; a first motor formed on the driving base frame and configured to rotate the first threaded rod; and a first power transmission device which is formed on the driving base frame, is installed between the first threaded rod and the first motor, and is configured to transmit rotational power generated by the first motor to the first threaded rod.

In addition, according to the present invention, the movable plate may have a plunger groove corresponding to a plunger of the syringe.

In addition, according to the present invention, the first power transmission device may include a first drive pulley rotated by the first motor; a first belt wound around the first drive pulley and performing orbital movement; and a first driven pulley rotated by the first belt and configured to rotate the first threaded rod.

In addition, according to the present invention, the driving base module may further include a position detection device on one side, to detect lifting and lowering positions of the movable plate, and the position detection device may include a first photoelectric sensor configured to detect a detection unit of the movable plate located at the reference position; and a second photoelectric sensor configured to detect the detection unit of the movable plate located at the suction position.

In addition, according to the present invention, the syringe operation module may include a syringe fixing frame fixed to the driving base frame, with the syringe formed therein such that the front end of the syringe protrudes downward, and configured to support a plunger of the syringe, allowing the plunger to move freely up and down so that the movable plate can raise and lower the plunger; a first elastic member installed between the syringe fixing frame and the plunger, which applies an elastic restoring force in the direction of lowering the plunger; a pusher formed on the syringe fixing frame and configured to be freely raised and lowered by the movable plate; the tip removal plate formed at the lower end of the pusher, with a shape that interferes with the dispensing tip that is forcibly engaged with the front end of the syringe, enabling the removal of the dispensing tip; and a second elastic member installed between the syringe fixing frame and the pusher, which applies an elastic restoring force in the direction of raising the pusher.

In addition, according to the present invention, a first stepped portion with an outer diameter larger than that of a plunger groove of the movable plate may be formed on the plunger such that when the movable plate moves upward from the reference position to the suction position, the plunger is raised, and when the movable plate moves downward from the suction position to the reference position, the plunger is lowered by the first elastic member.

In addition, according to the present invention, a second stepped portion larger than an inner diameter of the second elastic member may be formed on the pusher such that when the movable plate moves downward from the reference position to the tip removal position, the tip removal plate is lowered along with the pusher, allowing the dispensing tip to be removed from the front end of the syringe, and when the movable plate moves upward from the tip removal position to the reference position, the tip removal plate is raised along with the pusher by the second elastic member.

In addition, according to the present invention, the tip removal plate may have an engaging hole with an inner diameter larger than an outer diameter of the front end and smaller than an outer diameter of the dispensing tip.

In addition, according to the present invention, the tip removal plate may have a punching pin portion formed on the lower surface thereof to punch the sealing paper of a cartridge.

In addition, according to the present invention, the syringe fixing frame may have an engaging pin portion formed to hook and detach a cartridge.

In addition, according to the present invention, the driving base module may further include a second threaded rod screwed through a second nut member formed on the driving base frame to allow the driving base module to move up and down; a second motor configured to rotate the second threaded rod; and a second power transmission device installed between the second threaded rod and the second motor and configured to transmit rotational power generated by the second motor to the second threaded rod.

In addition, according to the present invention, the second power transmission device may include a second drive pulley rotated by the second motor; a second belt wound around the second drive pulley and performing orbital movement; and a second driven pulley rotated by the second belt and configured to rotate the second threaded rod.

Advantageous Effects

According to some embodiments of the present invention as described above, various functions such as attaching a dispensing tip, aspirating liquid, dispensing liquid, removing a dispensing tip, and punching the sealing paper of a cartridge can all be performed automatically by a single device, thereby not only enabling automation of the device, but also significantly reducing manufacturing costs and installation space while greatly improving reliability and accuracy in performing each function. However, the scope of the present invention is not limited by the above effects.

MODE FOR INVENTION

Figure 1:
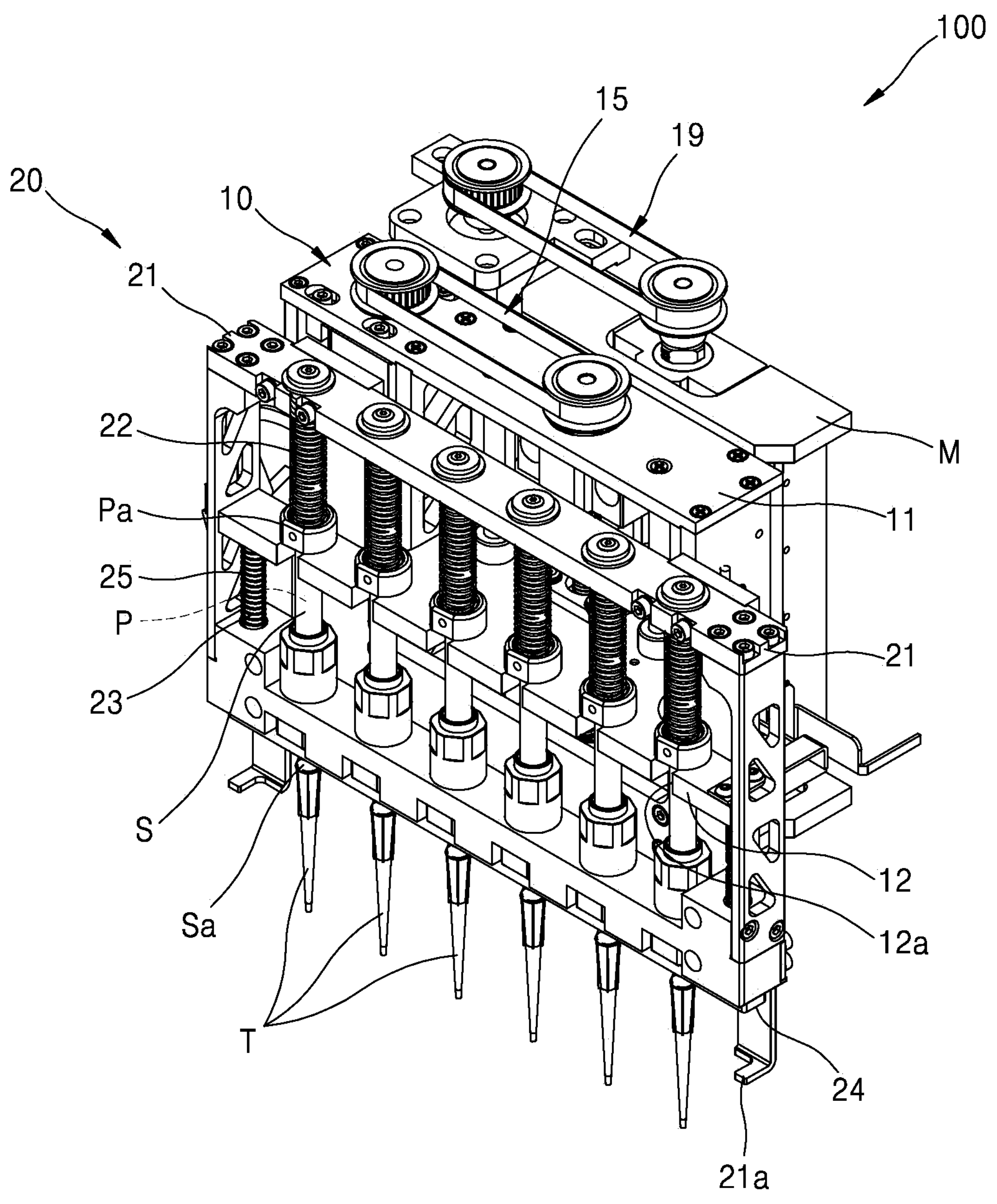
FIG. 1 is a perspective view of a suction dispensing device having a removable tip according to some embodiments of the present invention.

The embodiments of the present invention are provided for more fully describing the present invention to those skilled in the art, and the embodiments below may be modified in various forms, and the scope of the present invention is not limited to the embodiments below. Rather, these embodiments are provided such that this disclosure will be thorough and complete and will fully convey the spirit of the present invention to those skilled in the art. Also, thickness or sizes of layers in the drawings are exaggerated for convenience of explanation and clarity.

Hereinafter, various preferred embodiments of the present invention will be described in detail with reference to the accompanying drawings.

Figure 2:
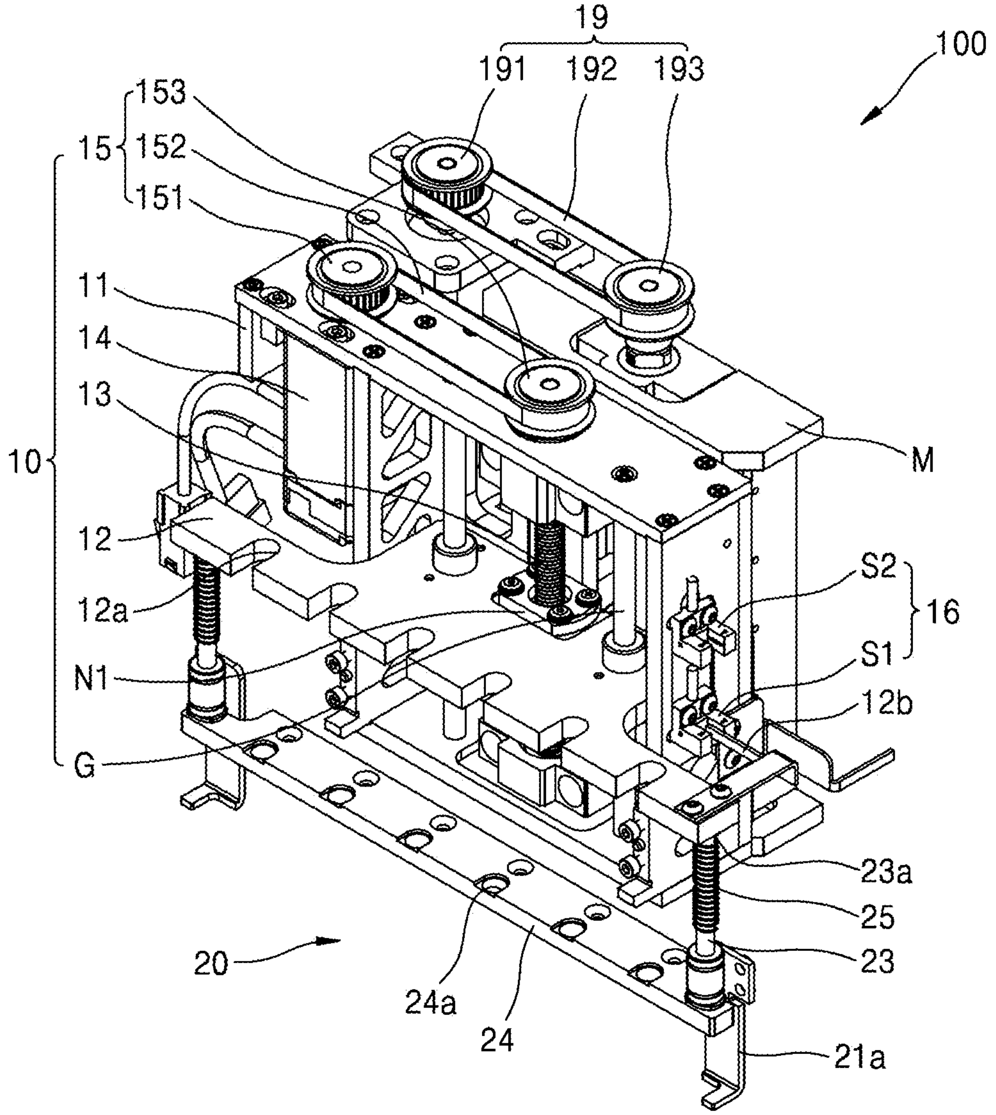
FIG. 2 is a front perspective view of a driving base module of the suction dispensing device having a removable tip shown in FIG. 1.
Figure 3:
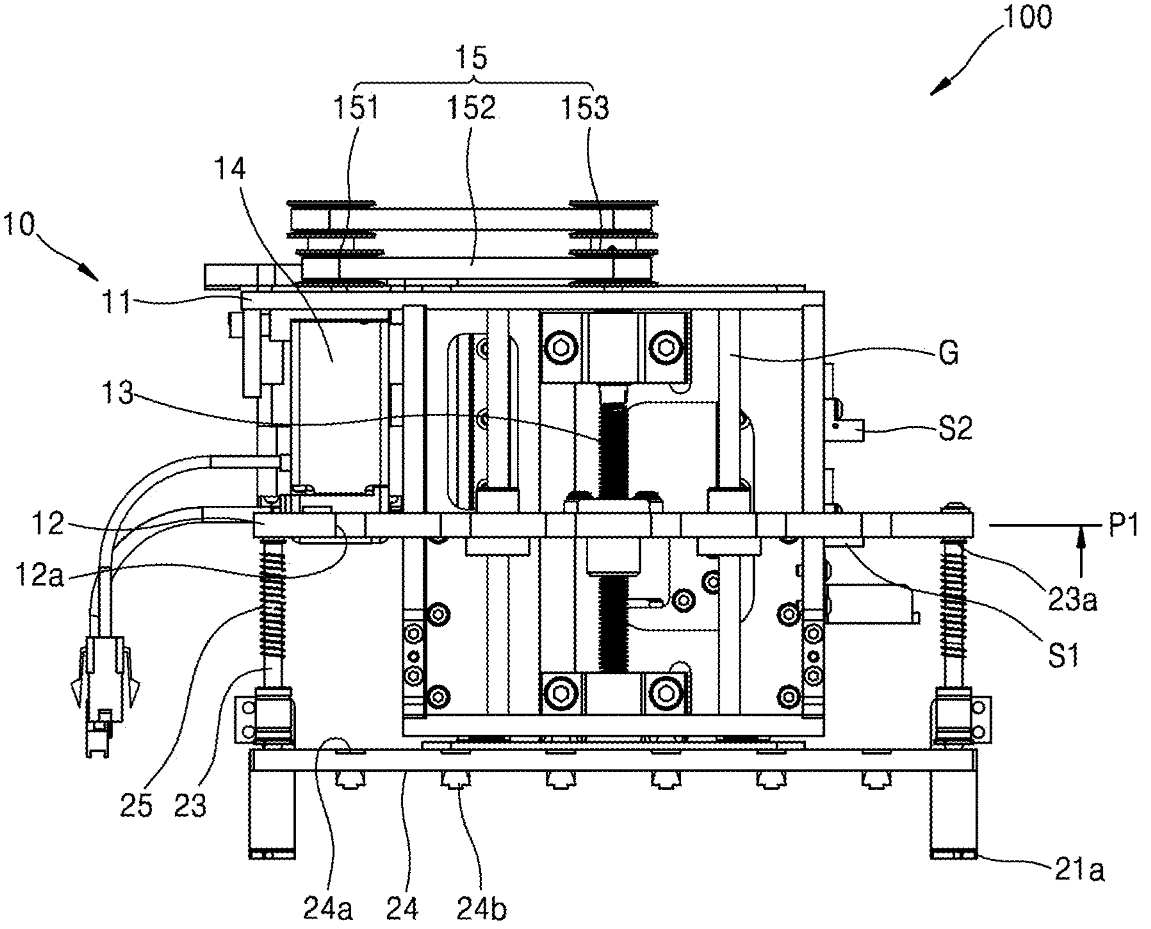
FIG. 3 is a front view of the driving base module shown in FIG. 2.
Figure 4:
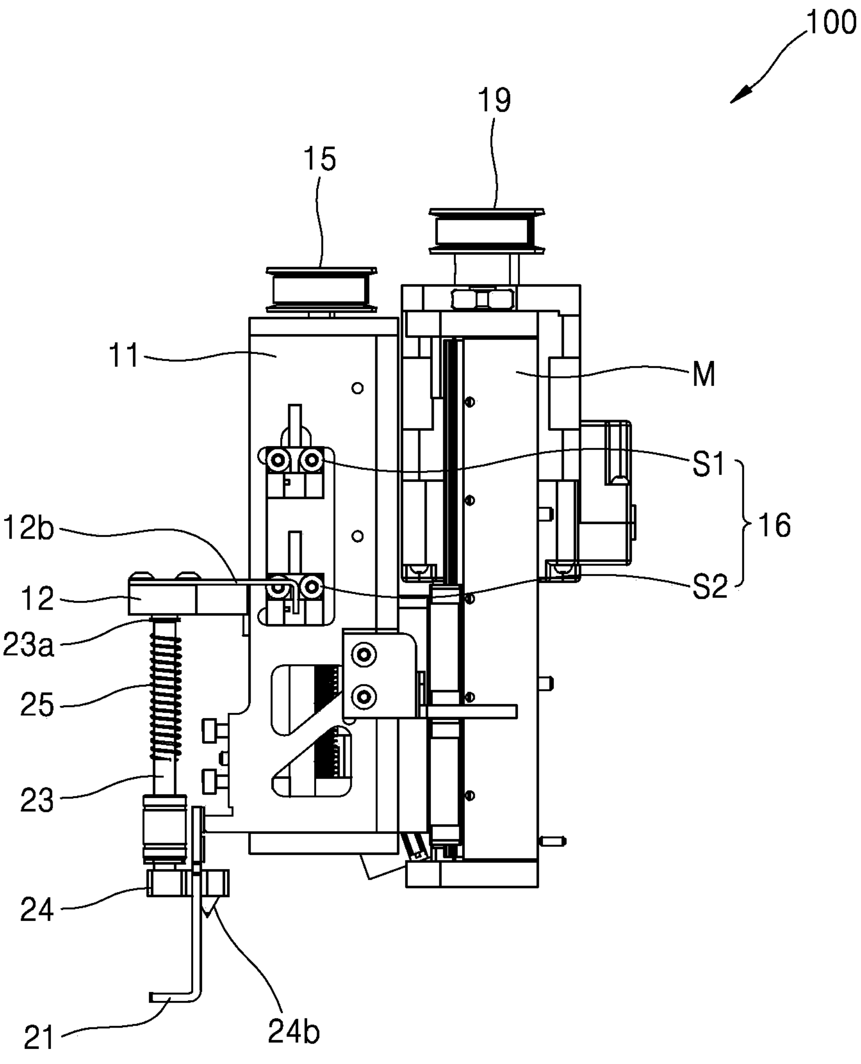
FIG. 4 is a side view of the driving base module shown in FIG. 2.
Figure 5:
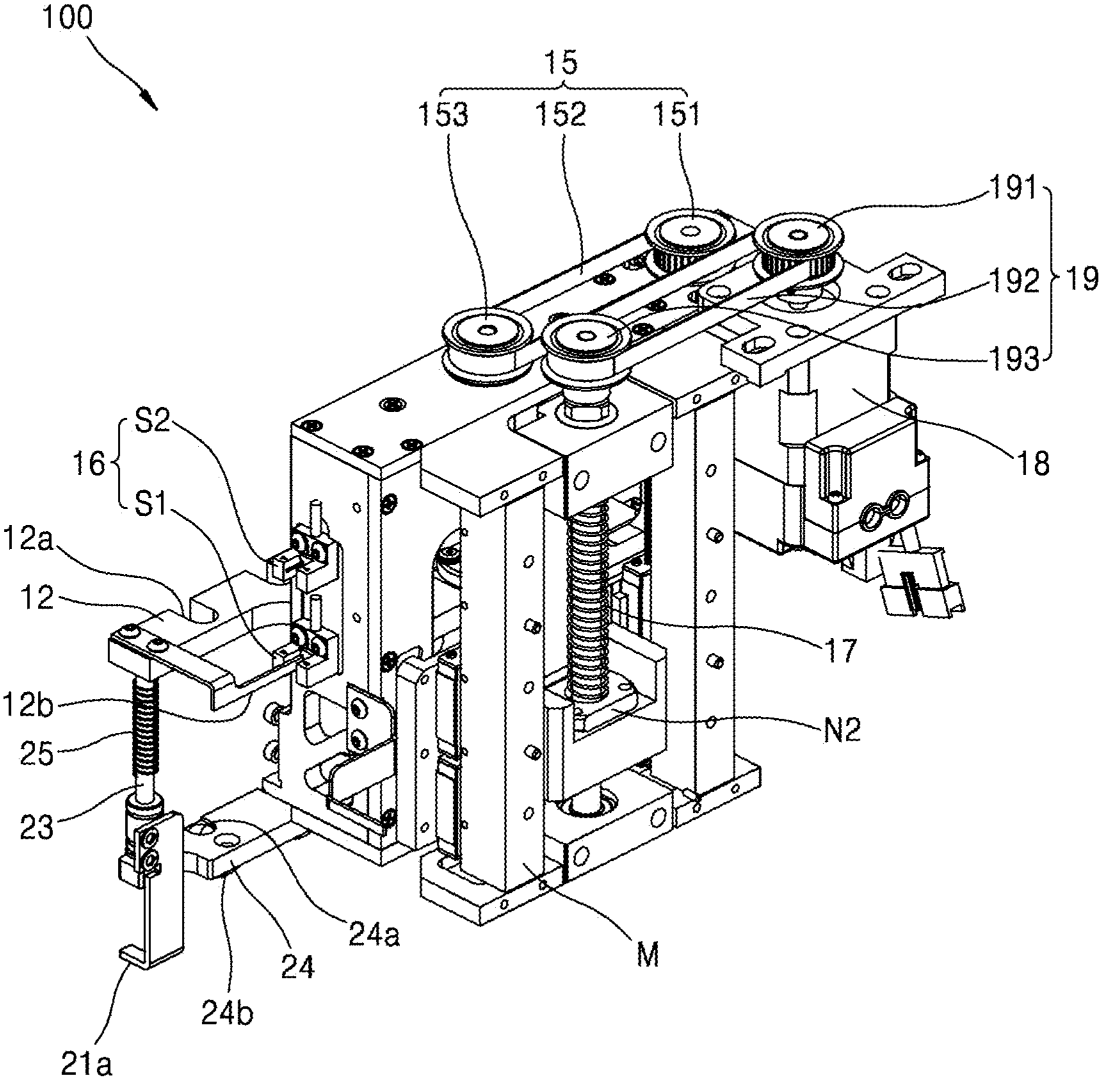
FIG. 5 is a rear perspective view of the driving base module shown in FIG. 2.
Figure 6:
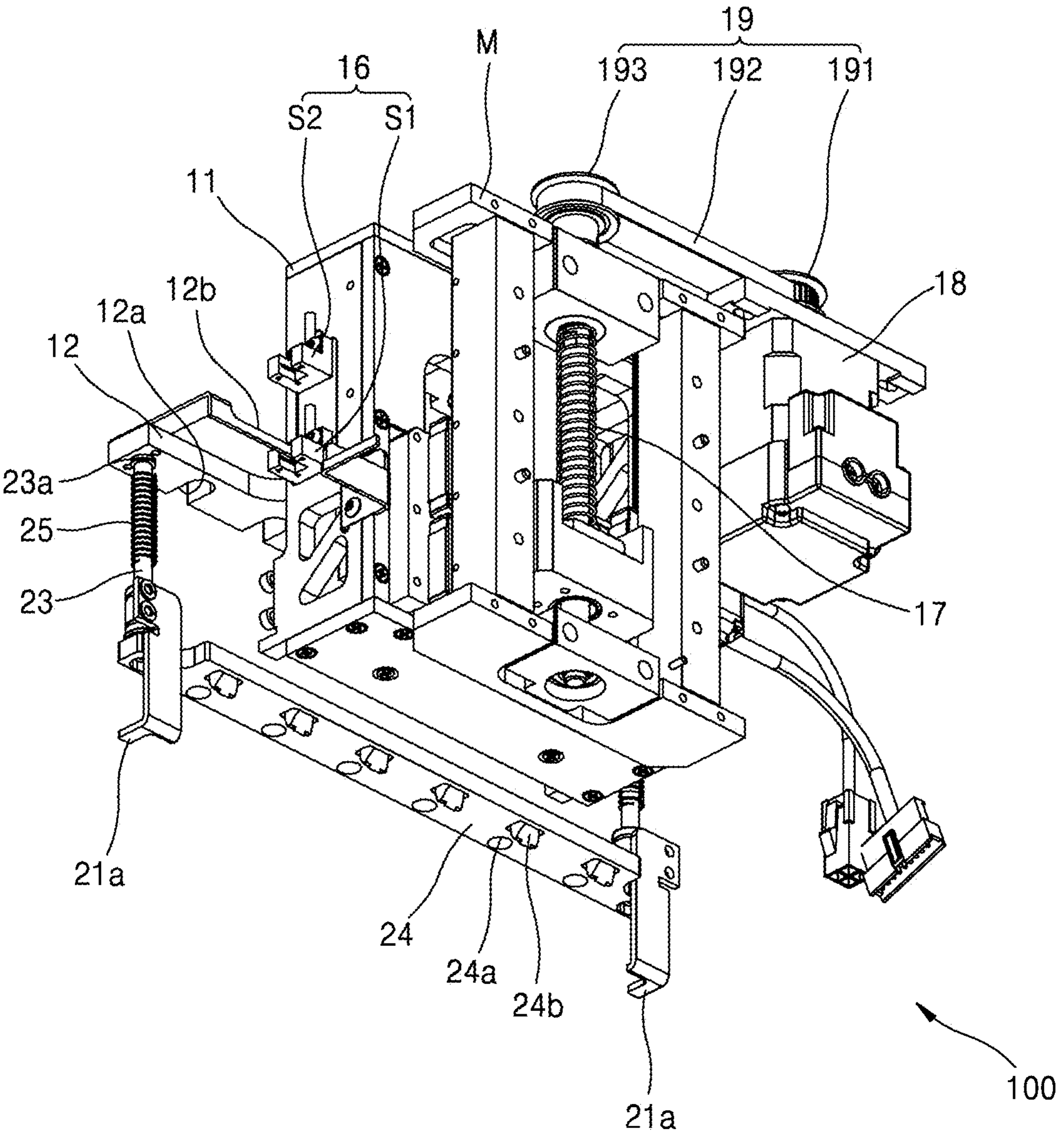
FIG. 6 is a bottom perspective view of the driving base module shown in FIG. 2.

FIG. 1 is a perspective view of a suction dispensing device 100 having a removable tip according to some embodiments of the present invention, FIG. 2 is a front perspective view of a driving base module 10 of the suction dispensing device 100 having a removable tip shown in FIG. 1, FIG. 3 is a front view of the driving base module 10 shown in FIG. 2, FIG. 4 is a side view of the driving base module 10 shown in FIG. 2, FIG. 5 is a rear perspective view of the driving base module 10 shown in FIG. 2, and FIG. 6 is a bottom perspective view of the driving base module 10 shown in FIG. 2.

First, as shown in FIGS. 1 to 6, a suction dispensing device 100 having a removal tip according to some embodiments of the present invention may largely include a driving base module 10 and a syringe operation module 20.

The driving base module 10 may support a movable plate 12, enabling the movable plate 12 to move up and down along the lifting and lowering path, and may raise and lower the movable plate 12.

The driving base module 10 may include a driving base frame 11, which is composed of a vertical member or a horizontal member so that the lifting and lowering path of the movable plate 12 is formed inside, a movable plate 12 configured to be movable up and down along a guide member G, such as a guide rod, provided in the driving base frame 11, a first threaded rod 13 which is screwed through a first nut member N1 formed on the movable plate 12 to allow the movable plate 12 to move up and down through screw motion, a first motor 14 installed in the driving base frame 11 and configured to rotate the first threaded rod 13, a first power transmission device 15 which is formed on the driving base frame 11, is installed between the first threaded rod 13 and the first motor 14, and is configured to transmit rotational power generated by the first motor 14 to the first threaded rod 13, and a position detection device 16 on one side to detect the lifting and lowering positions of the movable plate 12.

The movable plate 12 is a plate in which a plurality of plunger grooves 12*a*, corresponding to a plurality of plungers P of multiple (six in the drawing) syringes S, are formed, and may raise all the plungers P simultaneously.

The movable plate 12 is illustrated as a plate shape that moves up and down along the lifting and lowering path, but various other types of members that can raise and lower multiple plungers simultaneously may also be applied.

The first power transmission device 15 may include a first drive pulley 151 rotated by the first motor 14, a first belt 152 wound around the first drive pulley 151 and performing orbital movement, and a first driven pulley 153 rotated by the first belt 152 and configured to rotate the first threaded rod 13.

The first power transmission device 15 is not necessarily limited to the configuration shown in the drawings, and various types and forms of power transmission devices capable of transmitting the rotational power of the first motor 14 to the first threaded rod 13 may be applied, including gear combinations, pulley and wire combinations, sprocket wheel and chain combinations, and various pulley and belt combinations.

The position detection device 16 may include a first photoelectric sensor S1 configured to detect a detection portion 12*b* of the movable plate 12 located at a reference position P1 and a second photoelectric sensor S2 configured to detect the detection portion 12*b* of the movable plate 12 located at a suction position P2.

The position detection device 16 is not necessarily limited to photoelectric sensors, and a wide variety of position detection devices capable of detecting positions, such as magnet sensors or electromagnetic field sensors, may also be applied.

Therefore, according to the driving base module 10, when the first motor 14 rotates forward or reversely, the first drive pulley 151 of the first power transmission device 15 rotates forward or reversely, causing the first belt 152 to rotate in an orbital motion, which may, in turn, rotate the connected first driven pulley 153 forward or reversely.

Subsequently, as the first threaded rod 13 connected to the first driven pulley 153 rotates forward or reversely, the movable plate 12, along with the first nut member N1, may move up or down along the guide member G.

Next, the movable plate 12 may forcibly raise the plurality of plungers P of the multiple syringes S (six in the drawings) simultaneously to perform an aspiration mode, lower them to perform a dispensing mode, or further lower them to perform a tip removal mode.

The driving base module 10 may further include a second threaded rod 17 that is screwed through a second nut member N2 formed on the driving base frame 11 to allow the driving base module 10 to move up and down, a second motor 18 configured to rotate the second threaded rod 17, and a second power transmission device 19 installed between the second threaded rod 17 and the second motor 18 and configured to transmit the rotational power generated by the second motor 18 to the second threaded rod 17.

The second power transmission device 19 may include a second drive pulley 191 rotated by the second motor 18, a second belt 192 wound around the second drive pulley 191 and performing orbital movement, and a second driven pulley 193 rotated by the second belt 192 and configured to rotate the second threaded rod 17.

The second power transmission device 19 is not necessarily limited to the configuration shown in the drawings, and various types and forms of power transmission devices capable of transmitting the rotational power of the second motor 18 to the second threaded rod 17 can be applied, including gear combinations, pulley and wire combinations, sprocket wheel and chain combinations, and various pulley and belt combinations.

Therefore, according to the driving base module 10, when the second motor 18 rotates forward or reversely, the second drive pulley 191 of the second power transmission device 19 rotates forward or reversely, causing the second belt 192 to rotate in an orbital motion, which may, in turn, rotate the connected second driven pulley 193 forward or reversely.

Subsequently, as the second threaded rod 17 connected to the second driven pulley 193 rotates forward or reversely, the driving base frame 11, along with the second nut member N2, may move up or down.

Next, the driving base frame 11 may forcibly lower all syringes S simultaneously to perform a dispensing tip attachment mode or a punching mode.

Meanwhile, the syringe operation module 20 may be a type of head-shaped module in which at least one syringe S is installed so that when the movable plate 12 moves upward from the reference position P1 (see FIGS. 11 and 12) to the suction position P2 (see FIGS. 14 and 15), liquid is aspirated therein, and when the movable plate 12 returns to the reference position P1 (see FIGS. 17 and 18) from the suction position P2, the liquid is dispensed.

Figure 20:
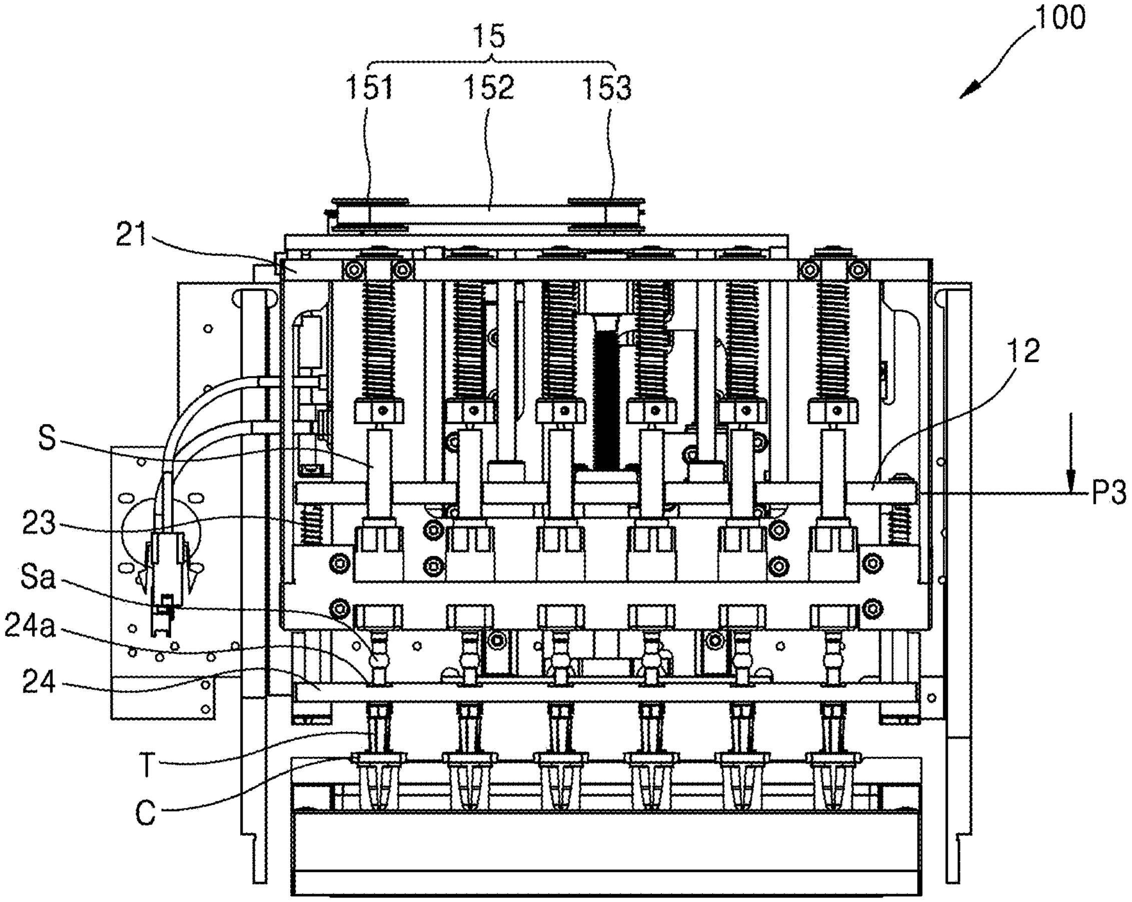
FIG. 20 is a front view illustrating the tip removal mode of the suction dispensing device shown in FIG. 19.
Figure 21:
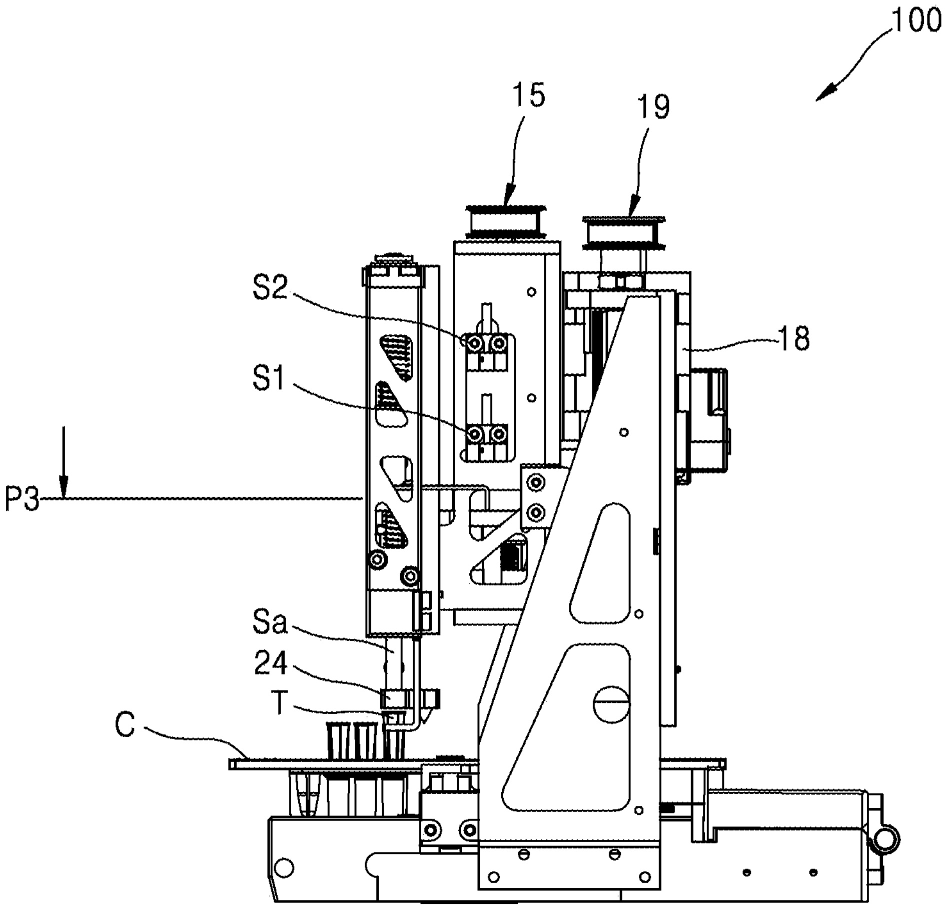
FIG. 21 is a side view illustrating the tip removal mode of the suction dispensing device shown in FIG. 19.

The syringe operation module 20 may include a tip removal plate 24, which allows the dispensing tip T, forcibly engaged with the front end Sa of the syringe S, to be removed when the movable plate 12 moves downward from the reference position P1 to a tip removal position P3 (see FIGS. 20 and 21).

For example, the syringe operation module 20 may include: a syringe fixing frame 21 fixed to the driving base frame 11, with the syringe S formed therein such that the front end Sa of the syringe S protrudes downward, and configured to support a plunger P of the syringe S, allowing the plunger P to move freely up and down so that the movable plate 12 can raise and lower the plunger P, a first elastic member 22 installed between the syringe fixing frame 21 and the plunger P, which applies an elastic restoring force in the direction of lowering the plunger P, a pusher 23 formed on the syringe fixed frame and configured to be freely raised and lowered by the movable plate 12, a tip removal plate 24 formed at the lower end of the pusher 23, with a shape that interferes with the dispensing tip T that is forcibly engaged with the front end Sa of the syringe S, enabling the removal of the dispensing tip T, and a second elastic member 25 installed between the syringe fixing frame 21 and the pusher 23, which applies an elastic restoring force in the direction of raising the pusher 23.

Here, the plunger P may include a first stepped portion Pa with an outer diameter larger than that of the plunger groove 12*a* of the movable plate 12.

Accordingly, when the movable plate 12 moves upward from the reference position P1 to the suction position P2, the plunger P may be raised, and when the movable plate 12 moves downward from the suction position P2 to the reference position P1, the plunger P may be lowered by the first elastic member 22.

In addition, the pusher 23 may include a second stepped portion 23*a* larger than the inner diameter of the second elastic member 25.

The tip removal plate 24 may have an engaging hole 24*a* with an inner diameter larger than the outer diameter of the front end Sa of the syringe S and smaller than the outer diameter of the dispensing tip T.

Therefore, when the movable plate 12 moves downward from the reference position P1 to the tip removal position P3, the tip removal plate 24 is lowered along with the pusher 23, allowing the dispensing tip T to removed from the front end Sa of the syringe S, and when the movable plate 12 moves upward from the tip removal position (P3) to the reference position (P1), the tip removal plate 24 rises along with the pusher 23 due to the elastic restoring force of the second elastic member 25.

The tip removal plate 24 may have a punching pin portion 24*b* formed on its lower surface to punch the sealing paper of a cartridge C.

Accordingly, when the tip removal plate 24, with the dispensing tip T removed, is lowered in the direction of the cartridge C, the punching pin portion 24*b* formed on the lower surface of the tip removal plate 24 punches the sealing paper to selectively open the cartridge C.

The syringe fixing frame 21 may have an engaging pin portion 21*a* formed to hook and detach the cartridge C.

Accordingly, the cartridge C may be selectively detached from a tray by hooking it with the engaging pin portion 21*a*.

FIGS. 7 to 24 are drawings illustrating the operating process of the suction dispensing device 100 having a removal tip according to some embodiments of the present invention.

As shown in FIGS. 7 to 24, the suction dispensing device 100 having a removal tip, according to some embodiments of the present invention, may selectively perform a dispensing tip attachment mode, a reference mode, an aspiration mode, a dispensing mode, a tip removal mode, and a punching mode.

Figure 7:
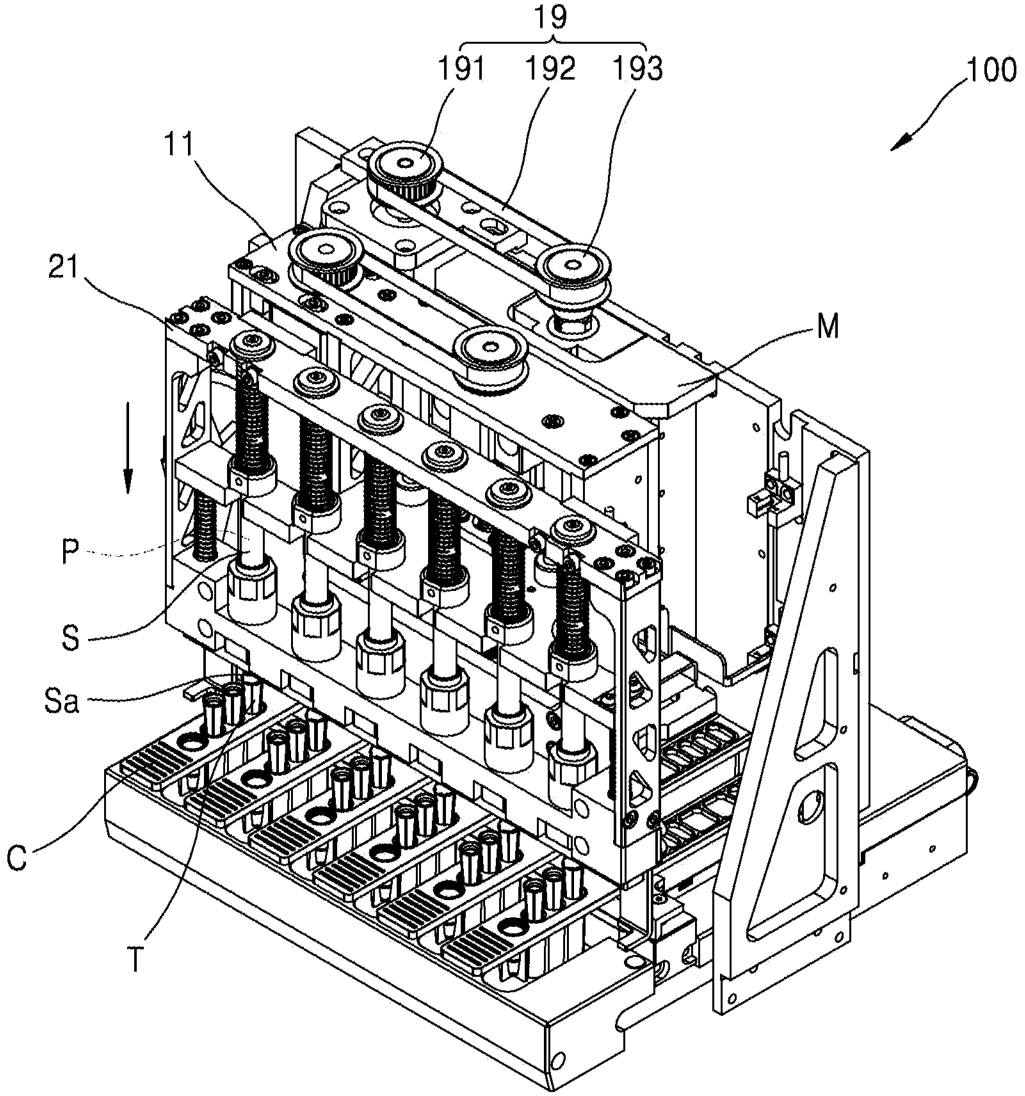
FIG. 7 is a perspective view illustrating the dispensing tip attachment mode of the suction dispensing device shown in FIG. 1.
Figure 8:
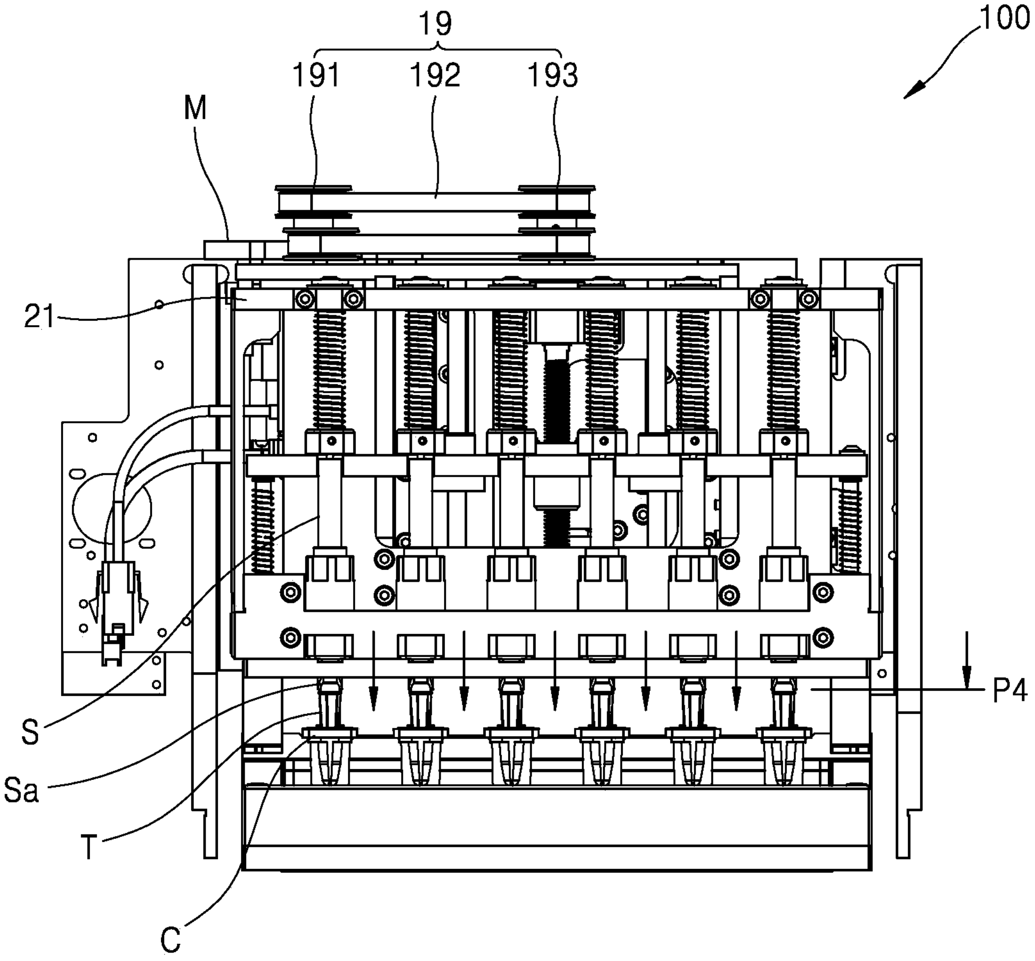
FIG. 8 is a front view illustrating the dispensing tip attachment mode of the suction dispensing device shown in FIG. 7.
Figure 9:
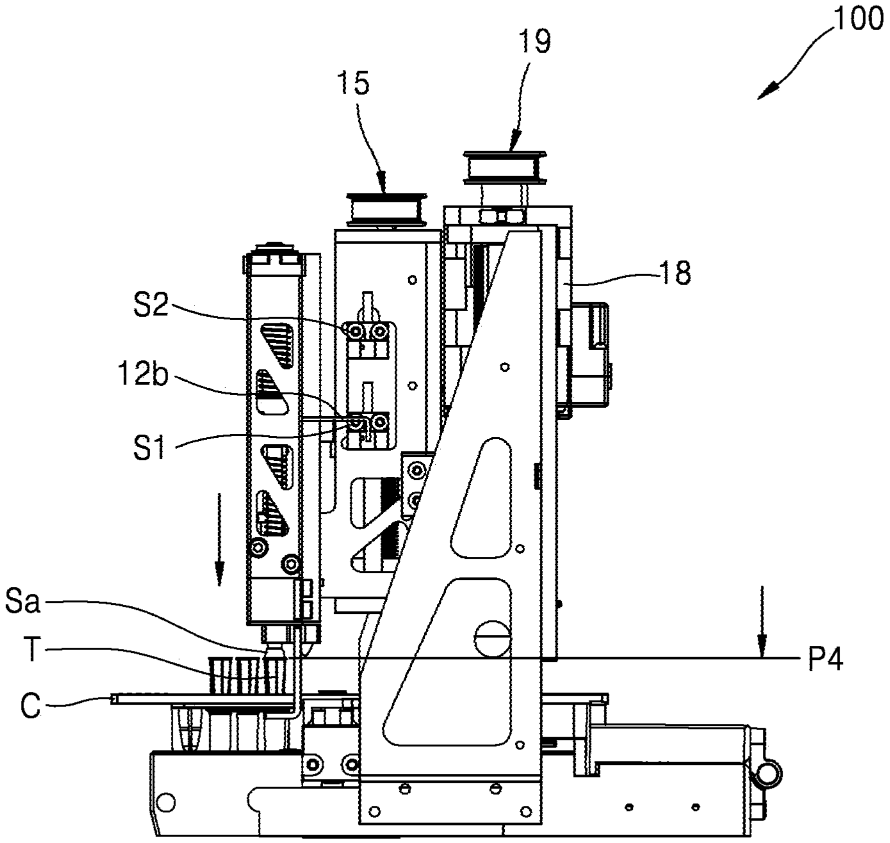
FIG. 9 is a side view illustrating the dispensing tip attachment mode of the suction dispensing device shown in FIG. 7.

FIG. 7 is a perspective view illustrating the dispensing tip attachment mode of the suction dispensing device 100 having a removable tip shown in FIG. 1, FIG. 8 is a front view illustrating the dispensing tip attachment mode of the suction dispensing device 100 having a removable tip shown in FIG. 7, and FIG. 9 is a side view illustrating the dispensing tip attachment mode of the suction dispensing device 100 having a removable tip shown in FIG. 7.

First, as shown in FIGS. 7 to 9, the suction dispensing device 100 having a removal tip, according to some embodiments of the present invention, may operate in the dispensing tip attachment mode as follows: when the second motor 18 rotates, the second drive pulley 191 of the second power transmission device 19 rotates, causing the second belt 192 to rotate in an orbital motion, which may, in turn, rotate the connected second driven pulley 193.

Subsequently, as the second threaded rod 17 connected to the second driven pulley 193 rotates, the front end Sa of the syringe S lowers toward the dispensing tip T along with the second nut member N2 to a dispensing tip attachment position P4, allowing multiple dispensing tips to be attached simultaneously.

Figure 10:
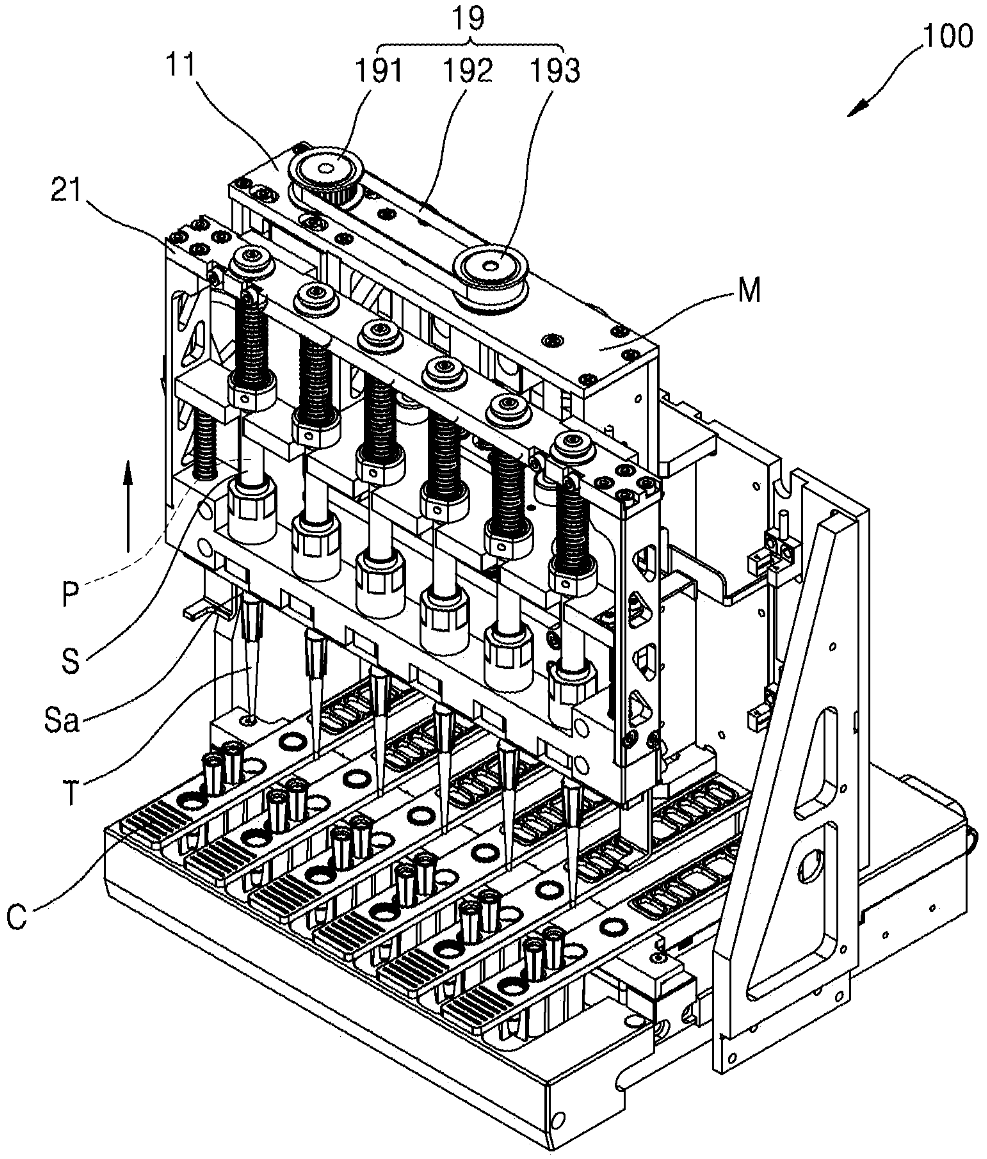
FIG. 10 is a perspective view illustrating the reference mode of the suction dispensing device shown in FIG. 1.
Figure 11:
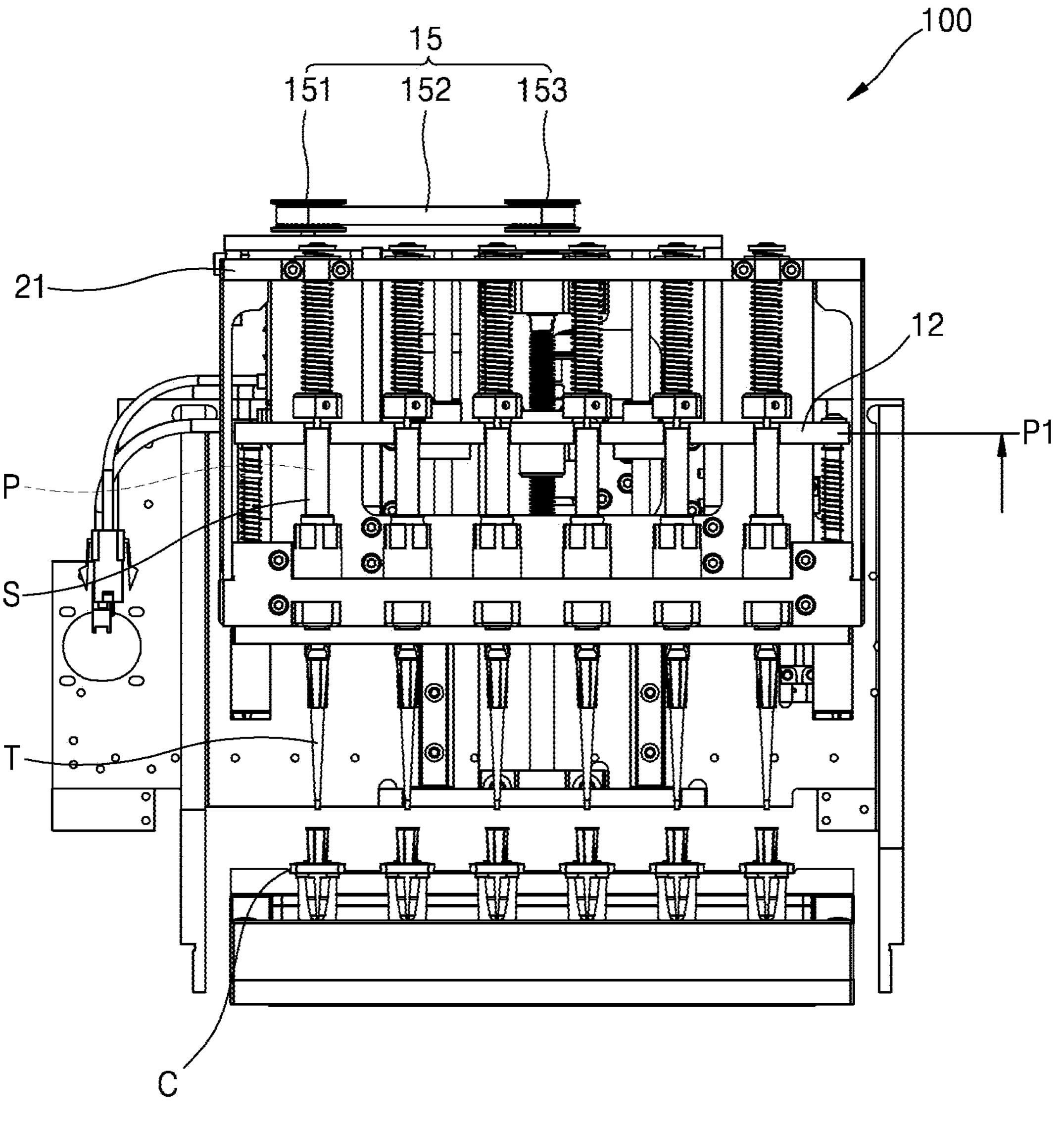
FIG. 11 is a front view illustrating the reference mode of the suction dispensing device shown in FIG. 10.

FIG. 10 is a perspective view illustrating the reference mode of the suction dispensing device 100 having a removal tip shown in FIG. 1. FIG. 11 is a front view illustrating the reference mode of the suction dispensing device 100 shown in 10, and FIG. 12 is a side view illustrating the reference mode of the suction dispensing device 100 shown in FIG. 10.

Figure 12:
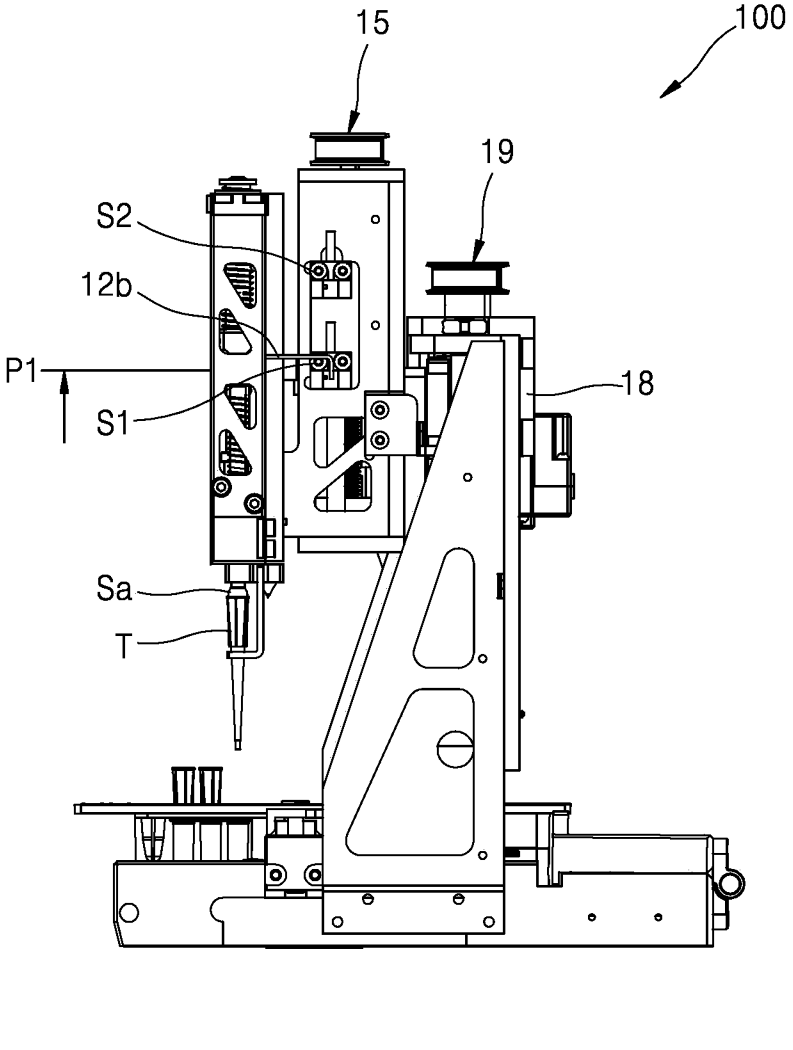
FIG. 12 is a side view illustrating the reference mode of the suction dispensing device shown in of FIG. 10.

As shown in FIGS. 10 to 12, the suction dispensing device 100 having a removal tip, according to some embodiments of the present invention, may operate in the reference mode as follows: when the first motor 14 rotates, the first drive pulley 151 of the first power transmission device 15 rotates, causing the first belt 152 to rotate in an orbital motion, which may, in turn, rotate the connected first driven pulley 153.

Subsequently, as the first threaded rod 13 connected to the first driven pulley 153 rotates, the movable plate 12 may be raised along the guide member G together with the first nut member N1.

Subsequently, the movable plate 12 may forcibly raise the plungers P of multiple syringes S (six in the drawings) simultaneously to position them at the reference position P1.

Figure 13:
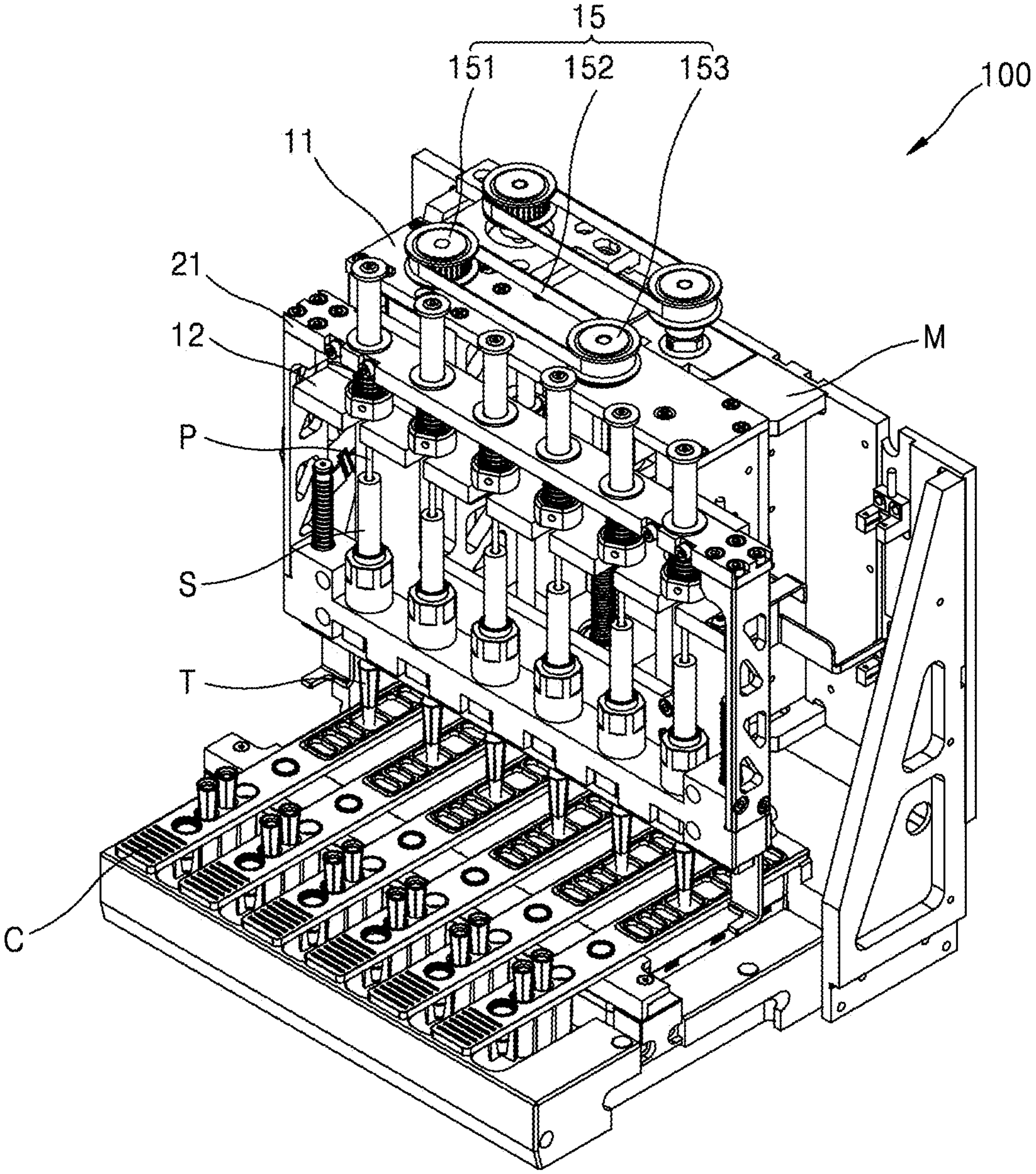
FIG. 13 is a perspective view illustrating the aspiration mode of the suction dispensing device shown in FIG. 1.
Figure 14:
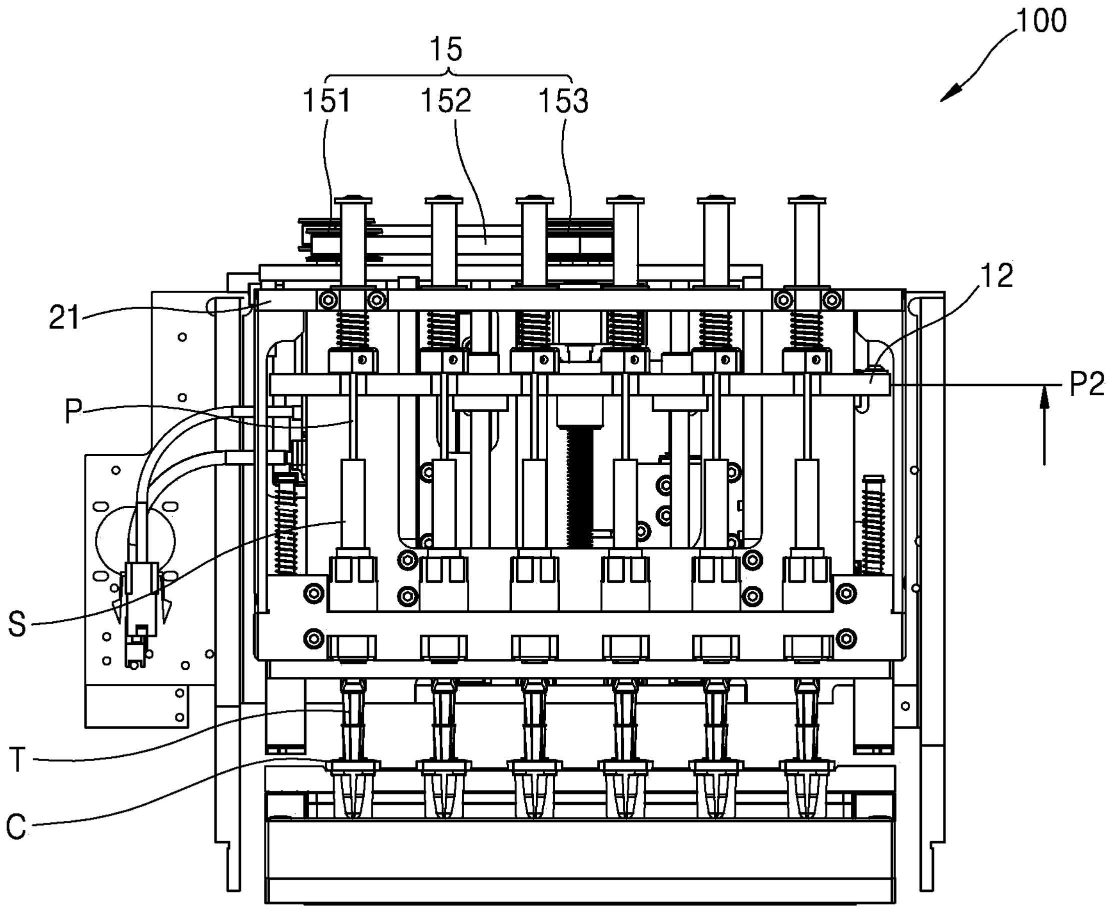
FIG. 14 is a front view illustrating the aspiration mode of the suction dispensing device shown in FIG. 13.
Figure 15:
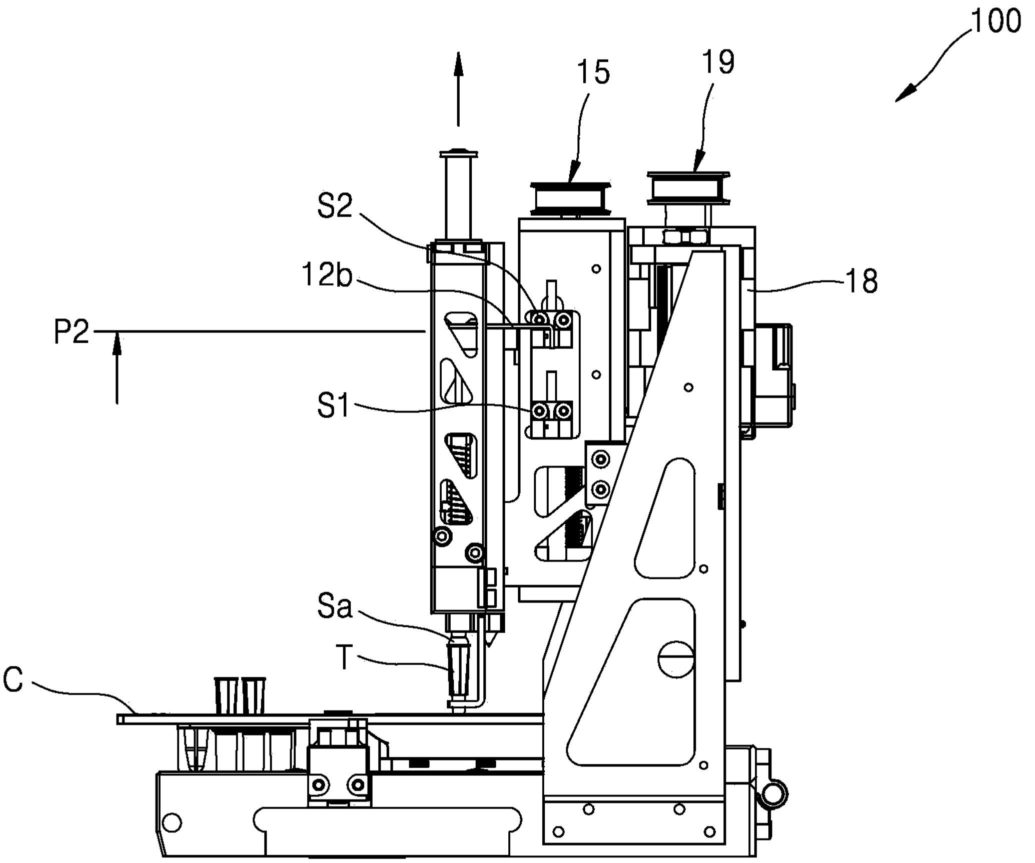
FIG. 15 is a side view illustrating the aspiration mode of the suction dispensing device shown in FIG. 13.

FIG. 13 is a perspective view illustrating the aspiration mode of the suction dispensing device 100 having a removal tip shown in FIG. 1, FIG. 14 is a front view illustrating the aspiration mode of the suction dispensing device 100 shown in FIG. 13, and FIG. 15 is a side view illustrating the aspiration mode of the suction dispensing device 100 shown in FIG. 13.

As shown in FIGS. 13 to 15, the suction dispensing device 100 having a removal tip, according to some embodiments of the present invention, may operate in the aspiration mode as follows: when the first motor 14 rotates, the first drive pulley 151 of the first power transmission device 15 rotates, causing the first belt 152 to rotate in an orbital motion, which may, in turn, rotate the connected first driven pulley 153.

Subsequently, as the first threaded rod 13 connected to the first driven pulley 153 rotates, the movable plate 12 may be raised along the guide member G together with the first nut member N1.

Then, the movable plate 12 may forcibly raise the plungers P of multiple syringes S (six in the drawings) simultaneously to position them at the suction position P2 to aspirate liquid.

Figure 16:
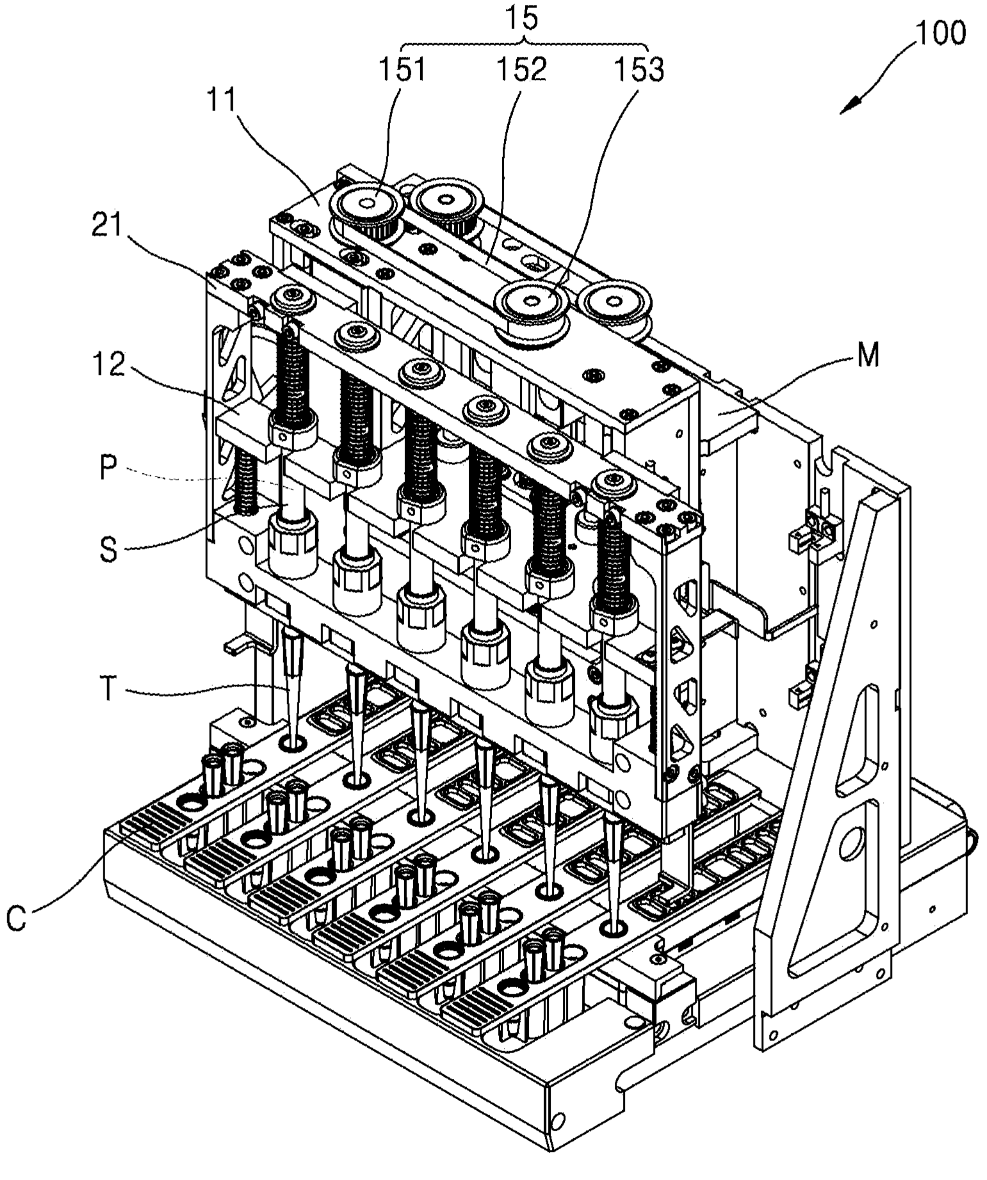
FIG. 16 is a perspective view illustrating the dispensing mode of the suction dispensing device shown in FIG. 1.
Figure 17:
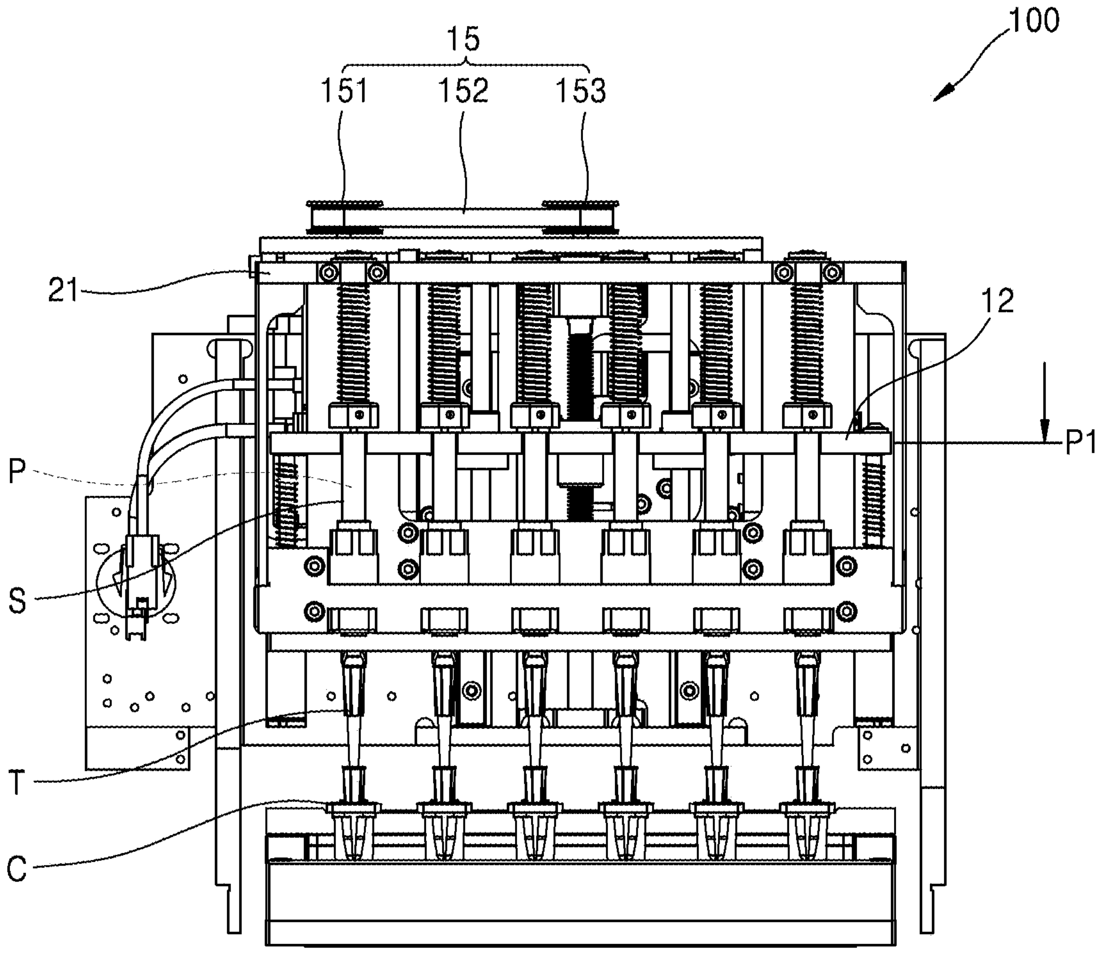
FIG. 17 is a front view illustrating the dispensing mode of the suction dispensing device shown in FIG. 16.
Figure 18:
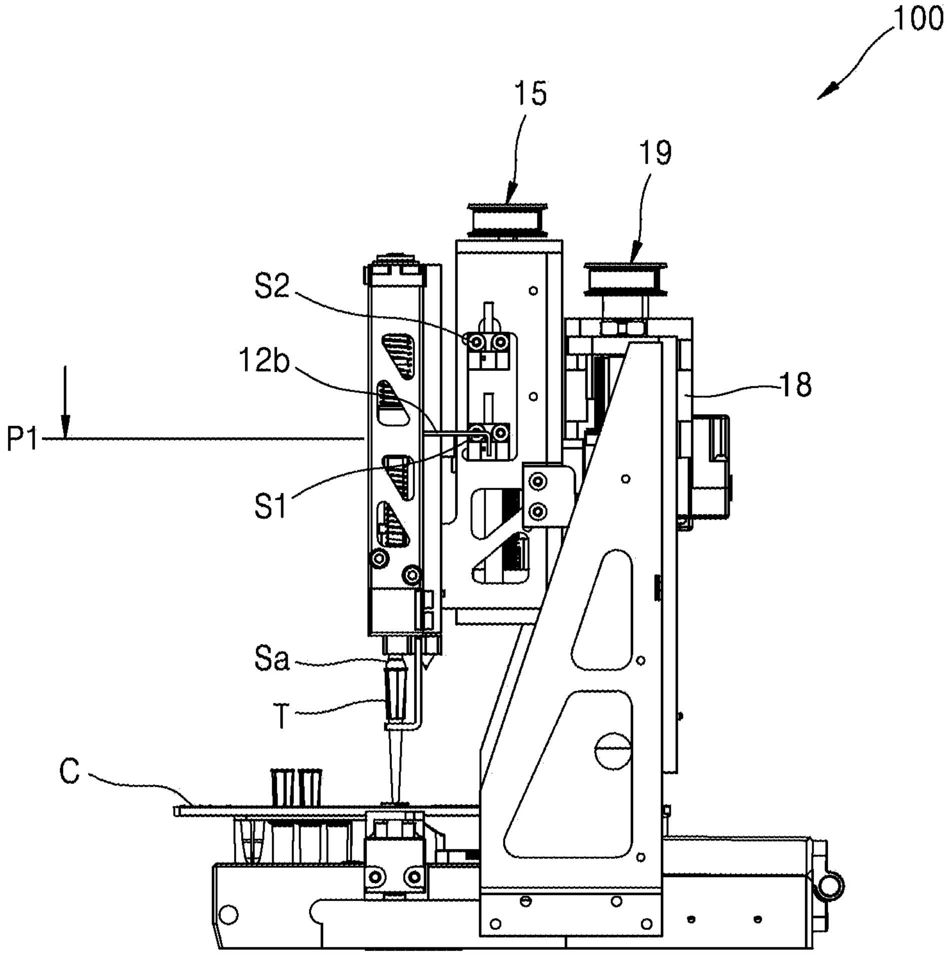
FIG. 18 is a side view illustrating the dispensing mode of the suction dispensing device shown in FIG. 16.

FIG. 16 is a perspective view illustrating the dispensing mode of the suction dispensing device 100 having a removal tip shown in FIG. 1, FIG. 17 is a front view illustrating the dispensing mode of the suction dispensing device 100 shown in FIG. 16, and FIG. 18 is a side view illustrating the dispensing mode of the suction dispensing device 100 shown in FIG. 16.

As shown in FIGS. 16 to 18, the suction dispensing device 100 having a removal tip, according to some embodiments of the present invention, may operate in the dispensing mode as follows: when the first motor 14 rotates, the first drive pulley 151 of the first power transmission device 15 rotates, causing the first belt 152 to rotate in an orbital motion, which may, in turn, rotate the connected first driven pulley 153.

Subsequently, as the first threaded rod 13 connected to the first driven pulley 153 rotates, the movable plate 12 may be lowered along the guide member G together with the first nut member N1.

Then, the movable plate 12 may forcibly lower the plungers P of multiple syringes S (six in the drawings) simultaneously to return to the reference position P1 to dispense the aspirated liquid.

Figure 19:
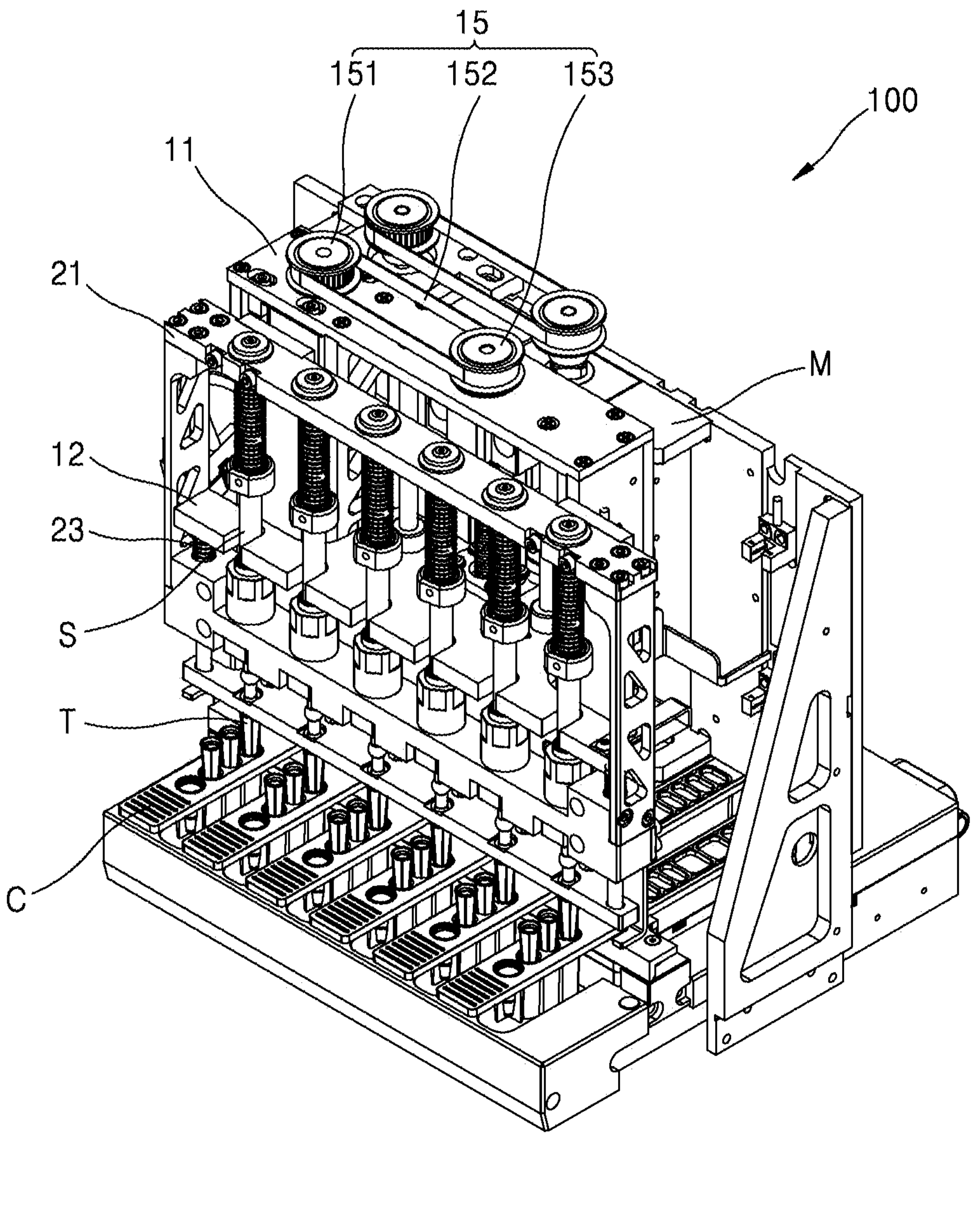
FIG. 19 is a perspective view illustrating the tip removal mode of the suction dispensing device shown in FIG. 1.

FIG. 19 is a perspective view illustrating the tip removal mode of the suction dispensing device 100 having a removal tip shown in FIG. 1, FIG. 20 is a front view illustrating the tip removal mode of the suction dispensing device 100 shown in FIG. 19, and FIG. 21 is a side view illustrating the tip removal mode of the suction dispensing device 100 shown in FIG. 19.

As shown in FIGS. 19 to 21, the suction dispensing device 100 having a removal tip, according to some embodiments of the present invention, may operate in the tip removal mode as follows: when the first motor 14 rotates, the first drive pulley 151 of the first power transmission device 15 rotates, causing the first belt 152 to rotate in an orbital motion, which may, in turn, rotate the connected first driven pulley 153.

Subsequently, as the first threaded rod 13 connected to the first driven pulley 153 rotates, the movable plate 12 may be further lowered along the guide member G together with the first nut member N1.

Then, the movable plate 12 may position the tip removal plate 24 at the tip removal position P4 by lowering the pusher 23 so that multiple dispensing tips T attached to the syringes S can be removed simultaneously from the syringes S.

Figure 22:
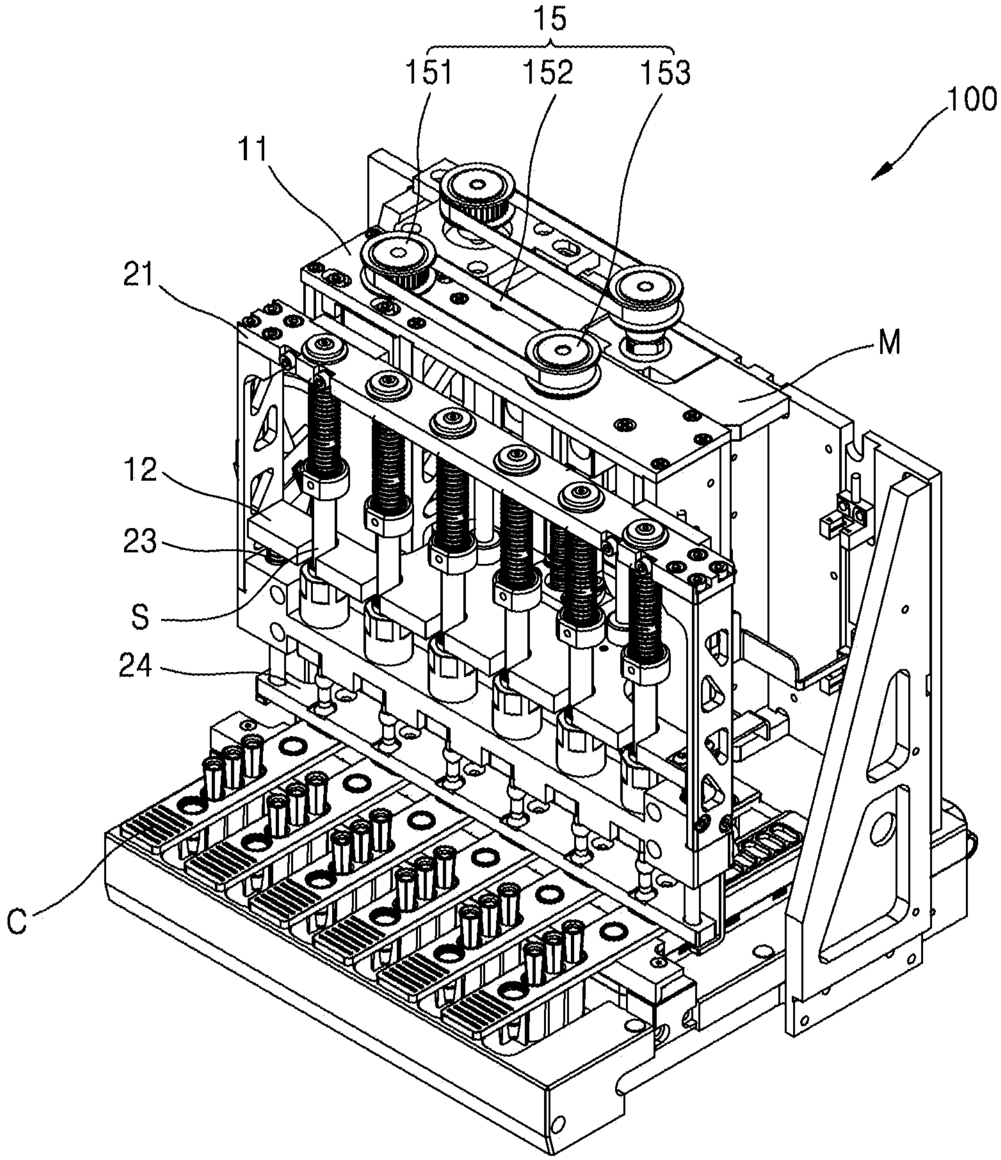
FIG. 22 is a perspective view illustrating the punching mode of the suction dispensing device shown in FIG. 1.
Figure 23:
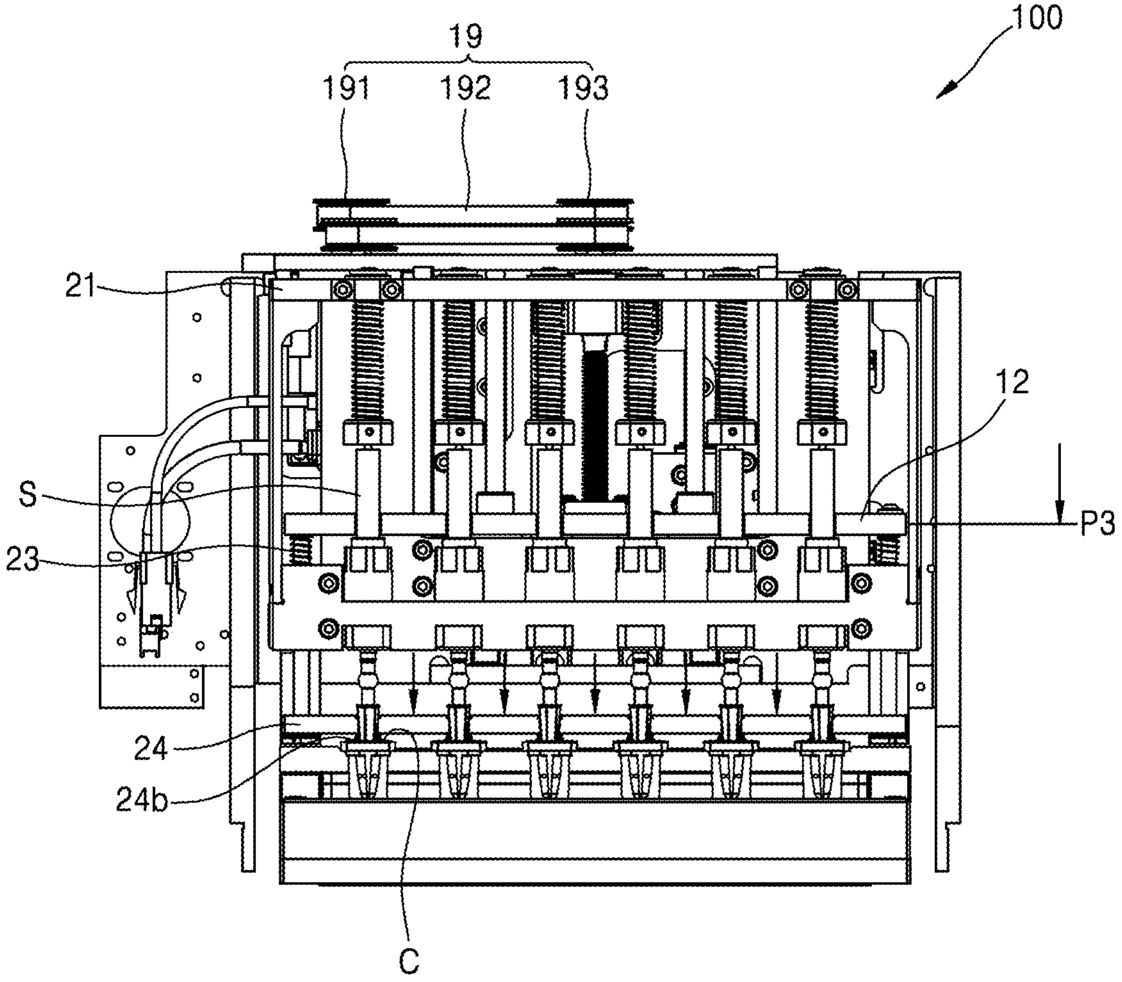
FIG. 23 is a front view illustrating the punching mode of the suction dispensing device shown in FIG. 22.
Figure 24:
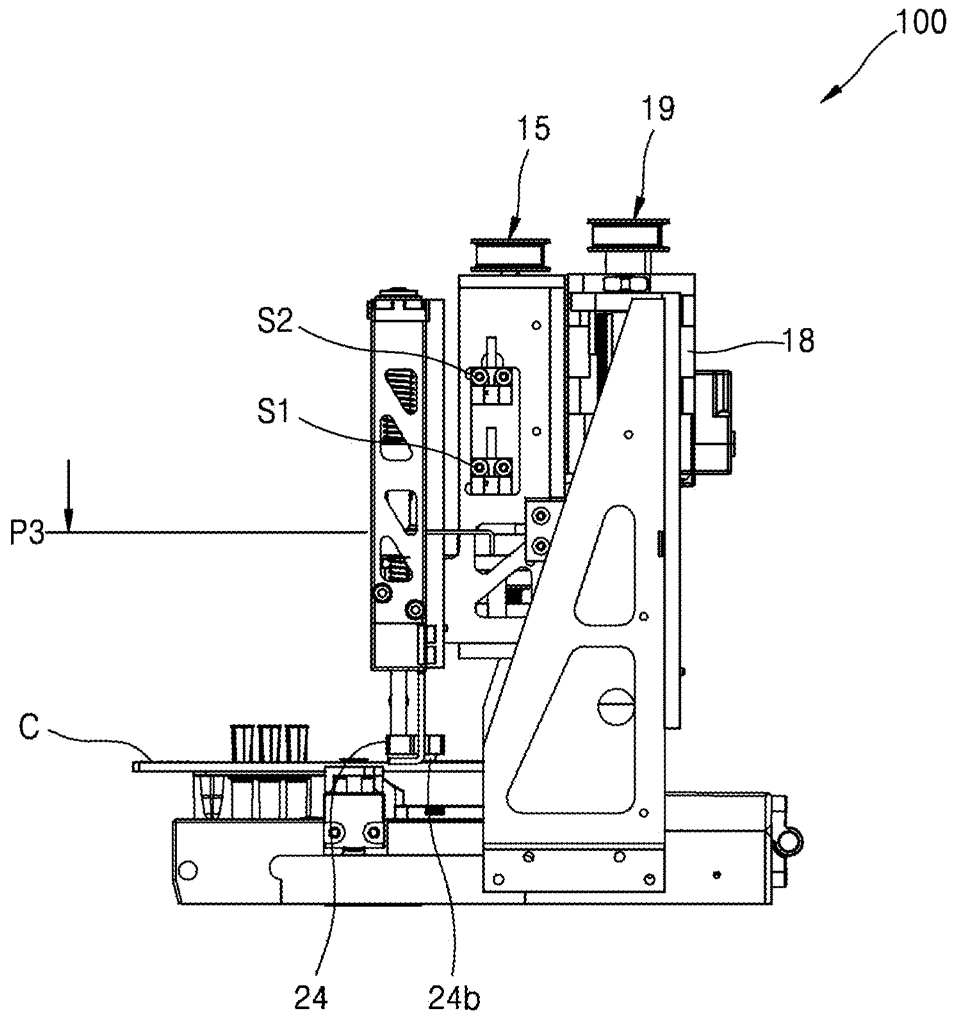
FIG. 24 is a side view illustrating the punching mode of the suction dispensing device shown in FIG. 22.

FIG. 22 is a perspective view illustrating the punching mode of the suction dispensing device 100 having a removal tip shown in FIG. 1, FIG. 23 is a front view illustrating the punching mode of the suction dispensing device 100 shown in FIG. 22, and FIG. 24 is a side view illustrating the punching mode of the suction dispensing device 100 shown in FIG. 22.

As shown in FIGS. 22 and 24, the suction dispensing device 100 having a removal tip, according to some embodiments of the present invention, may operate in the punching mode as follows: when the second motor 18 rotates, the second drive pulley 191 of the second power transmission device 19 rotates, causing the second belt 192 to rotate in an orbital motion, which may, in turn, rotate the connected second driven pulley 193.

Subsequently, as the second threaded rod 17 connected to the second driven pulley 193 rotates, the punching pin portion 24*b* of the tip removal plate 24 may be positioned on the sealing paper of the cartridge C together with the second nut member N2. At this time, the movable plate 12 may be positioned at the reference position P1.

Therefore, According to the present invention as described above, various functions such as attaching a dispensing tip, aspirating liquid, dispensing liquid, removing a dispensing tip, and punching the sealing paper of a cartridge can all be performed automatically by a single device, thereby not only enabling automation of the device, but also significantly reducing manufacturing costs and installation space while greatly improving reliability and accuracy in performing each function.

Although the present invention has been described in connection with the exemplary embodiment shown in the drawings, these are merely illustrative and those skilled in the art will understand that various modifications and equivalents can be made therefrom. Therefore, the scope of the present invention should be defined only by the appended claims.

The invention claimed is:

1. A suction dispensing device having a removal tip, the suction dispensing device comprising:

- a driving base module configured to raise and lower a movable plate; and
- a syringe operation module having at least one syringe installed therein, wherein liquid is aspirated into the at least one syringe when the movable plate rises from a reference position to a suction position, and the liquid is dispensed when the movable plate returns to the reference position from the suction position,
- wherein the syringe operation module includes a tip removal plate configured to remove a dispensing tip, forcefully engaged with a front end of the at least one syringe, when the movable plate moves downward from the reference position to a tip removal position, and
- wherein the driving base module comprises:
  - a driving base frame;
  - the movable plate configured to move up and down along a guide member disposed on the driving base frame;
  - a first threaded rod screwed through a first nut member formed on the movable plate to move the movable plate to up and down through screw motion;
  - a first motor formed on the driving base frame and configured to rotate the first threaded rod; and
  - a first power transmission device formed on the driving base frame and installed between the first threaded rod and the first motor, and configured to transmit rotational power generated by the first motor to the first threaded rod.

2. The suction dispensing device of claim 1, wherein the movable plate has a plunger groove corresponding to a plunger of the at least one syringe.

3. The suction dispensing device of claim 1, wherein the first power transmission device comprises

- a first drive pulley rotated by the first motor;
- a first belt wound around the first drive pulley and configured to perform orbital movement; and a first driven pulley rotated by the first belt and configured to rotate the first threaded rod.

4. The suction dispensing device of claim 1, wherein the driving base module comprises a position detection device on one side, the position detection device configured to detect lifting and lowering positions of the movable plate, and the position detection device comprises a first photoelectric sensor configured to detect a detection unit of the movable plate located at the reference position and a second photoelectric sensor configured to detect the detection unit of the movable plate located at the suction position.

5. The suction dispensing device of claim 1, wherein the syringe operation module comprises:

a syringe fixing frame fixed to the driving base frame, with the at least one syringe having a front end protruding downward, and configured to support a plunger of the at least one syringe to allow the plunger to move freely up and down, wherein the movable plate is configured to raise and lower the plunger;

a first elastic member installed between the syringe fixing frame and the plunger, and configured to apply an elastic restoring force in a direction of lowering the plunger;

a pusher formed on the syringe fixing frame and configured to be freely raised and lowered by the movable plate;

the tip removal plate formed at a lower end of the pusher, and having a shape configured to interfere with the dispensing tip that is forcibly engaged with the front end of the at least one syringe, enabling removal of the dispensing tip; and a second elastic member installed between the syringe fixing frame and the pusher, and configured to apply an elastic restoring force in a direction of raising the pusher.

6. The suction dispensing device of claim 5, wherein a first stepped portion with an outer diameter larger than that of a plunger groove of the movable plate is formed on the plunger to raise the plunger when the movable plate rises from the reference position to the suction position, and to allow the first elastic member to lower the plunger when the movable plate moves downward from the suction position to the reference position.

7. The suction dispensing device of claim 5, wherein a second stepped portion larger than an inner diameter of the second elastic member is formed on the pusher to lower the tip removal plate along with the pusher when the movable plate moves downward from the reference position to the tip removal position, allowing the dispensing tip to be removed from the front end of the at least one syringe, and to allow the second elastic member to raise the tip removal plate along wit the pusher when the movable plate moves upward from the tip removal position to the reference position.

8. The suction dispensing device of claim 5, wherein the tip removal plate has an engaging hole with an inner diameter larger than an outer diameter of the front end and smaller than an outer diameter of the dispensing tip.

9. The suction dispensing device of claim 1, wherein the tip removal plate has a punching pin portion formed on a lower surface thereof to punch sealing paper of a cartridge.

10. The suction dispensing device of claim 5, wherein the syringe fixing frame has an engaging pin portion formed to hook and detach a cartridge.

11. The suction dispensing device of claim 1, wherein the driving base module further comprises:

a second threaded rod screwed through a second nut member formed on the driving base frame to allow the driving base module to move up and down;

a second motor configured to rotate the second threaded rod; and a second power transmission device installed between the second threaded rod and the second motor and configured to transmit rotational power generated by the second motor to the second threaded rod.

12. The suction dispensing device of claim 11, wherein the second power transmission device comprises:

a second drive pulley rotated by the second motor;

a second belt wound around the second drive pulley and configured to perform orbital movement; and a second driven pulley rotated by the second belt and configured to rotate the second threaded rod.

* * * * *